United States Patent
Song

(10) Patent No.: US 12,557,157 B2
(45) Date of Patent: Feb. 17, 2026

(54) METHOD AND APPARATUS FOR DUAL CONNECTIVITY IN COMMUNICATION SYSTEM

(71) Applicant: Electronics and Telecommunications Research Institute, Daejeon (KR)

(72) Inventor: Jae Su Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 426 days.

(21) Appl. No.: 17/957,404

(22) Filed: Sep. 30, 2022

(65) Prior Publication Data
US 2023/0105749 A1  Apr. 6, 2023

(30) Foreign Application Priority Data

Oct. 1, 2021 (KR) .................. 10-2021-0131157
Sep. 5, 2022 (KR) .................. 10-2022-0112053

(51) Int. Cl.
*H04W 76/15* (2018.01)
*H04W 8/22* (2009.01)

(52) U.S. Cl.
CPC ............. *H04W 76/15* (2018.02); *H04W 8/22* (2013.01)

(58) Field of Classification Search
CPC ..... H04W 36/185; H04W 36/03; H04W 8/22; H04W 76/15; H04W 8/24; H04W 76/14; H04W 88/04
See application file for complete search history.

(56) References Cited

U.S. PATENT DOCUMENTS

| | | |
|---|---|---|
| 10,869,241 B2 | 12/2020 | Ozturk et al. |
| 10,880,032 B2 | 12/2020 | Yi et al. |
| 2012/0176958 A1* | 7/2012 | Queseth ............ H04B 7/15542 370/315 |
| 2015/0045033 A1 | 2/2015 | Kim et al. |
| 2016/0330781 A1 | 11/2016 | Kalhan et al. |
| 2019/0158993 A1 | 5/2019 | Kwon |
| 2020/0252838 A1 | 8/2020 | Akdeniz et al. |
| 2020/0275485 A1 | 8/2020 | Babaei et al. |
| 2020/0374750 A1 | 11/2020 | Lee et al. |

(Continued)

FOREIGN PATENT DOCUMENTS

KR   10-2018-0034524   4/2018

OTHER PUBLICATIONS

3GPP TR 38.836 V17.1.0 (Mar. 2021); 3rd Generation Partnership Project; Technical Specification Group Radio Access Network; Study on NR sidelink relay; (Release 17); pp. 1-26.

(Continued)

*Primary Examiner* — Congvan Tran
(74) *Attorney, Agent, or Firm* — KILE PARK REED & HOUTTEMAN PLLC

(57) ABSTRACT

An operation method of a first base station in a communication system may comprise: identifying whether a first terminal supports a dual active protocol stack (DAPS); identifying whether a first relay terminal supports a layer 2 (L2) relay structure; and in response to identifying that the first terminal supports the DAPS and the first relay terminal supports the L2 relay structure, configuring dual connectivity for the first terminal using the first relay terminal.

14 Claims, 22 Drawing Sheets

(56) References Cited

U.S. PATENT DOCUMENTS

| | | | |
|---|---|---|---|
| 2021/0006318 A1 | 1/2021 | Kim et al. | |
| 2021/0320759 A1 | 10/2021 | Lee et al. | |
| 2022/0279607 A1 | 9/2022 | Burbidge et al. | |
| 2023/0171651 A1* | 6/2023 | Liu | H04W 76/12 370/331 |
| 2023/0180076 A1* | 6/2023 | Paladugu | H04W 36/0058 370/331 |
| 2023/0247513 A1* | 8/2023 | Paladugu | H04W 88/04 370/315 |
| 2023/0345346 A1* | 10/2023 | Fujishiro | H04L 47/12 |
| 2024/0121695 A1* | 4/2024 | Sharma | H04W 36/0058 |
| 2024/0187847 A1* | 6/2024 | Zhuo | H04W 12/033 |
| 2024/0214848 A1* | 6/2024 | Kang | H04W 40/22 |
| 2024/0214894 A1* | 6/2024 | Gürsu | H04W 36/0011 |
| 2024/0284272 A1* | 8/2024 | Teyeb | H04W 36/0061 |

OTHER PUBLICATIONS

3GPP TSG RAN Meeting #92-e, "UE Aggregation," Electronic Meeting, Jun. 14-18, 2021, RWS-210451.

3GPP TS 38.300, 3rd Generation Partnership Project; Technical Specification Group Radio Access Network; NR; NR and NG-RAN Overall Description; Stage 2 (Release 16), V16.7.0 (Sep. 2021), 3GPP, Valbonne, France.

3GPP TSG-RAN WG2 Meeting #112-e, "Summary email discussion [621][Relay] of Service continuity," Electronic Meeting, Nov. 2-13, 2020, R2-2010346.

* cited by examiner

METHOD AND APPARATUS FOR DUAL CONNECTIVITY IN COMMUNICATION SYSTEM

CROSS-REFERENCE TO RELATED APPLICATIONS

This application claims priority to Korean Patent Applications No. 10-2021-0131157, filed on Oct. 1, 2021, and Korean Patent Applications No. 10-2022-0112053, filed on Sep. 5, 2022, with the Korean Intellectual Property Office (KIPO), the entire contents of which are hereby incorporated by reference.

BACKGROUND

1. Technical Field

The present disclosure relates to a dual connectivity (DC) technique in a communication system, and more particularly, to a DC technique for providing communication services by configuring DC using a mobile relay in a communication system.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, a communication system may use mobile relay(s) to extend a network coverage, eliminate shadow areas, and improve the performance at a cell edge region. These relay technologies may use fixed relays or mobile relays. Compared to a fixed relay, such the mobile relay can lower installation costs, flexibly adjust coverages for providing communication services, and selectively use a more favorable channel environment. However, in the mobile relay, service interruption may occur frequently due to frequent switching between a network and the relay, and thus the quality of service may be deteriorated.

SUMMARY

In order to solve the above-identified problems, exemplary embodiments of the present disclosure are directed to providing a method and an apparatus for dual connectivity (DC) in a communication system, which can provide DC to communication services using mobile relay(s).

According to a first exemplary embodiment of the present disclosure for achieving the above-described objective, an operation method of a first base station in a communication system may comprise: identifying whether a first terminal supports a dual active protocol stack (DAPS); identifying whether a first relay terminal supports a layer 2 (L2) relay structure; and in response to identifying that the first terminal supports the DAPS and the first relay terminal supports the L2 relay structure, configuring dual connectivity for the first terminal using the first relay terminal.

The identifying whether the first terminal supports the DAPS may comprise: requesting a terminal capability report from the first terminal; receiving, from the first terminal, terminal capability information including information on whether the first terminal supports the DAPS; and identifying whether the first terminal supports the DAPS based on the terminal capability information.

The identifying whether the first terminal supports the DAPS may comprise: requesting a terminal capability report from the first terminal connected to the first base station via a second relay terminal; receiving, from the first terminal and via the second relay terminal, terminal capability information including information on whether the first terminal supports the DAPS; and identifying whether the first terminal supports the DAPS based on the terminal capability information.

The identifying whether the first relay terminal supports the L2 relay structure may comprise: requesting, from the first terminal, information on a base station to which the first relay terminal is connected; receiving, from the first terminal, the information on the base station to which the first relay terminal is connected; in response to determining that the base station to which the first relay terminal is connected is the first base station based on the received information on the base station to which the first relay terminal is connected, requesting a terminal capability report from the first relay terminal; receiving, from the first relay terminal, terminal capability information including information on whether the first relay terminal supports the L2 relay structure; and identifying whether the first relay terminal supports the L2 relay structure based on the terminal capability information.

The identifying whether the first relay terminal supports the L2 relay structure may comprise: requesting, from the first terminal, information on a base station to which the first relay terminal is connected; receiving, from the first terminal, the information on the base station to which the first relay terminal is connected; in response to determining that the base station to which the first relay terminal is connected is a second base station based on the received information on the base station to which the first relay terminal is connected, requesting a terminal capability report for the first relay terminal from the second base station; receiving, from the second base station, terminal capability information for the first relay terminal including information on whether the first relay terminal supports the L2 relay structure; and identifying whether the first relay terminal supports the L2 relay structure based on the terminal capability information.

The configuring dual connectivity for the first terminal using the first relay terminal may comprise: transmitting, to the first terminal, measurement configuration information; receiving, from the first terminal, a measurement result including a received signal quality for the first base station; in response to determining that the received signal quality is greater than or equal to a first threshold, maintaining connection with the first terminal; and configuring dual connectivity for the first terminal using the first relay terminal.

The operation method may further comprise: transmitting first data to the first terminal; and transmitting second data to the first terminal via the first relay terminal.

The operation method may further comprise: receiving, from the first terminal, a measurement result including a received signal quality for the first base station; and in response to determining that the received signal quality is less than a first threshold, releasing configuration of the dual connectivity by releasing connection with the first terminal while maintaining connection between the first terminal and the first relay terminal.

The operation method may further comprise: receiving, from the first terminal, a measurement result including a received signal quality for the first relay terminal; and in response to determining that the received signal quality for the first relay terminal is less than a second threshold, releasing configuration of the dual connectivity by releasing connection between the first base station and the first terminal while maintaining connection between the first terminal and the first relay terminal.

According to a second exemplary embodiment of the present disclosure for achieving the above-described objective, an operation method of a first terminal in a communication system may comprise: receiving, from a base station, a terminal capability report request; transmitting, to the base station, terminal capability information including information on whether the first terminal supports a dual activation protocol stack (DAPS); measuring a first received signal strength for neighboring relay terminals; transmitting, to the base station, a list of the neighboring relay terminals and information of the measured first received signal strength; receiving, from the base station, information on a relay terminal selected from among the neighboring relay terminals and a dual connectivity request; and configuring dual connectivity by being connected with the selected relay terminal while maintaining connection with the base station.

The operation method may further comprise: transmitting first data to the base station; and transmitting second data to the base station via the selected relay terminal.

The operation method may further comprise: measuring a second received signal strength for the selected relay terminal; transmitting, to the base station, information on the second received signal strength measured for the selected relay terminal; in response to determining that the second received signal strength is less than a threshold, receiving, from the base station, a request of releasing the dual connectivity with the selected relay terminal; and releasing the connection with the selected relay terminal.

According to a third exemplary embodiment of the present disclosure for achieving the above-described objective, a first base station may comprise a processor configured to cause the first base station to: identify whether a first terminal supports a dual active protocol stack (DAPS); identify whether a first relay terminal supports a layer 2 (L2) relay structure; and in response to identifying that the first terminal supports the DAPS and the first relay terminal supports the L2 relay structure, configure dual connectivity for the first terminal using the first relay terminal.

In the identifying whether the first terminal supports the DAPS, the processor may further cause the first base station to: request a terminal capability report from the first terminal; receive, from the first terminal, terminal capability information including information on whether the first terminal supports the DAPS; and identify whether the first terminal supports the DAPS based on the terminal capability information.

In the identifying whether the first terminal supports the DAPS, the processor may further cause the first base station to: request a terminal capability report from the first terminal connected to the first base station via a second relay terminal; receive, from the first terminal and via the second relay terminal, terminal capability information including information on whether the first terminal supports the DAPS; and identify whether the first terminal supports the DAPS based on the terminal capability information.

In the identifying whether the first relay terminal supports the L2 relay structure, the processor may further cause the first base station to: request, from the first terminal, information on a base station to which the first relay terminal is connected; receive, from the first terminal, the information on the base station to which the first relay terminal is connected; in response to determining that the base station to which the first relay terminal is connected is the first base station based on the received information on the base station to which the first relay terminal is connected, request a terminal capability report from the first relay terminal; receive, from the first relay terminal, terminal capability information including information on whether the first relay terminal supports the L2 relay structure; and identify whether the first relay terminal supports the L2 relay structure based on the terminal capability information.

In the configuring dual connectivity for the first terminal using the first relay terminal, the processor may further cause the first base station to: transmit, to the first terminal, measurement configuration information; receive, from the first terminal, a measurement result including a received signal quality for the first base station; in response to determining that the received signal quality is greater than or equal to a first threshold, maintain connection with the first terminal; and configure dual connectivity for the first terminal using the first relay terminal.

According to the present disclosure, a terminal can simultaneously configure two radio links through a base station and a mobile relay. Since the terminal can simultaneously configure two radio links through the base station and the mobile relay in this manner, the terminal can be dual-connected with the network side. Further, according to the present disclosure, the base station and the mobile relay can transmit data to the terminal in duplicate by applying a packet duplication function. Since the base station and the mobile relay can transmit data in duplicate to the terminal, the communication reliability in radio sections can be improved. Further, according to the present disclosure, when connection switching between the base station and the relay terminal with respect to the terminal frequently occurs due to mobility of the mobile relay, data can be transmitted in duplicate to the terminal, thereby preventing occurrence of a service interruption.

DETAILED DESCRIPTION OF THE EMBODIMENTS

Figure 1:
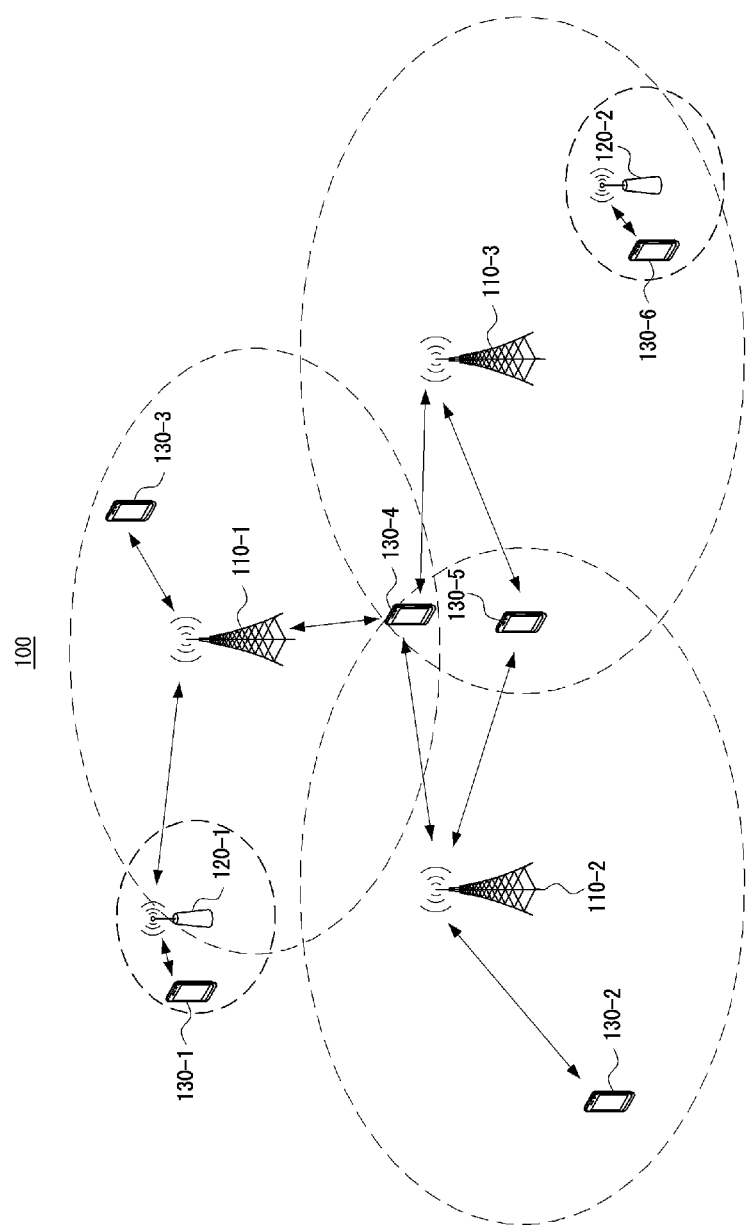
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
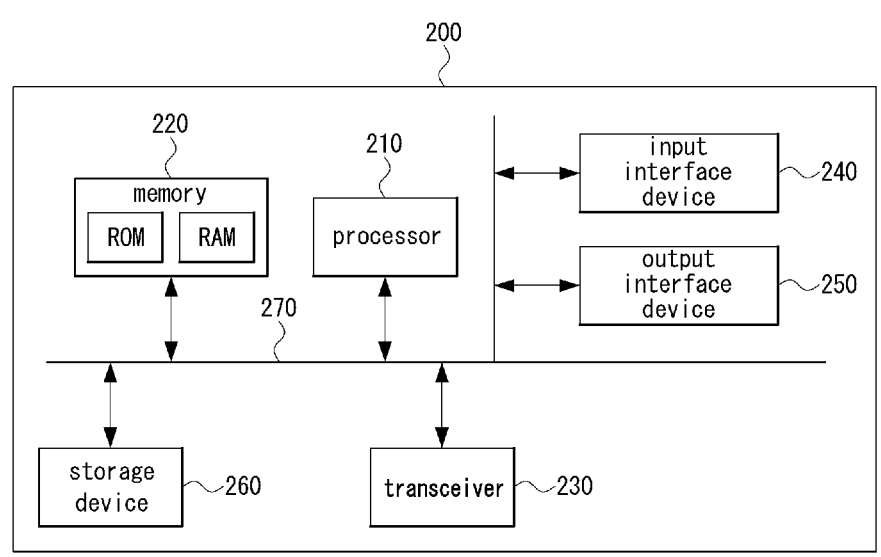
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, a communication system may extend a network coverage by using relay technologies, eliminate shadow areas, and improve the performance at a cell edge region. These relay technologies may use fixed relays or mobile relays. Here, since the fixed relay is disposed at a fixed position on the ground, it is possible to provide a communication service for a specific area. Since such the fixed type relay is installed at a fixed position on the ground, installation costs may be high. On the other hand, the mobile relay may have lower installation costs than the fixed relay, may flexibly adjust a communication service provision region, and may selectively use a more advantageous channel environment. Such the mobile relay may be mounted on an unmanned aerial vehicle (UAV) or vehicle. Recently, a vehicle-to-everything (V2X) service may receive a lot of attention as a communication service using such the mobile relays. In the 3GPP, various communication methods through the mobile relays are being proposed according to deployments of terminals accessing a network through the mobile relays.

Figure 3:
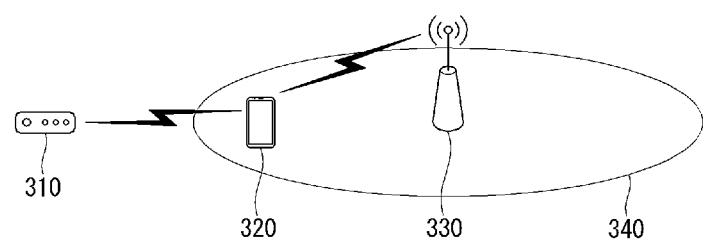
FIG. 3 is a conceptual diagram illustrating a first exemplary embodiment of a communication system using a mobile relay.

FIG. 3 is a conceptual diagram illustrating a first exemplary embodiment of a communication system using a mobile relay.

Referring to FIG. 3, a communication system may include a terminal 310, a mobile relay 320, and a base station 330. The terminal 310 may be located outside a service coverage 340 of the base station 330. The mobile relay 320 may be located inside the service coverage 340 of the base station 330. In such a situation, the terminal 310 may not directly access the base station 330 through a Uu interface. Accordingly, the terminal 310 may access the base station 330 through a PC5 interface via the mobile relay 320.

Figure 4:
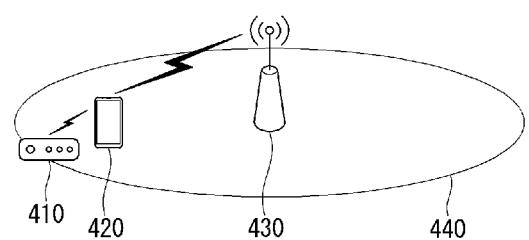
FIG. 4 is a conceptual diagram illustrating a second exemplary embodiment of a communication system using a mobile relay.

FIG. 4 is a conceptual diagram illustrating a second exemplary embodiment of a communication system using a mobile relay.

Referring to FIG. 4, a communication system may include a terminal 410, a mobile relay 420, and a base station 430. The terminal 410 may be located at an edge of a service coverage 440 of the base station 430. The mobile relay 420 may be located inside the service coverage 440 of the base station 430. In such a situation, since the terminal 410 is located at the edge of the service coverage 440 of the base station 430, even when it is directly access the base station 430 through a Uu interface, a radio channel may be in an unreliable state. Accordingly, the terminal 410 may access the base station 430 through a PC5 interface via the mobile relay 420.

Figure 5:
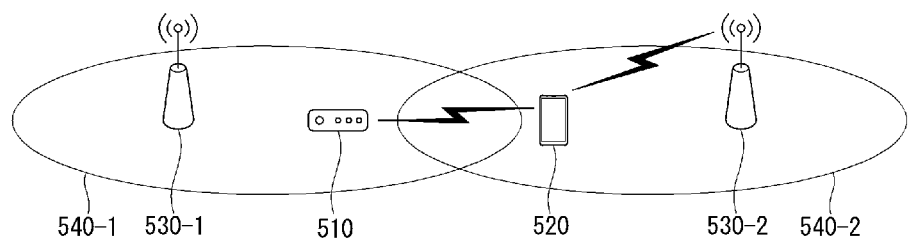
FIG. 5 is a conceptual diagram illustrating a third exemplary embodiment of a communication system using a mobile relay.

FIG. 5 is a conceptual diagram illustrating a third exemplary embodiment of a communication system using a mobile relay.

Referring to FIG. 5, a communication system may include a terminal 510, a mobile relay 520, a first base station 530-1, and a second base station 530-2. The terminal 510 may be located inside a service coverage 540-1 of the first base station 530-1. In addition, the terminal 510 may be located outside a service coverage 540-2 of the second base station 530-2. The mobile relay 520 may be located outside the service coverage 540-1 of the first base station 530-1, but may be located inside the service coverage 540-2 of the second base station 530-2. In this situation, the terminal 510 may not directly access the second base station 530-2 through a Uu interface. Accordingly, the terminal 510 may access the second base station 530-2 through a PC5 interface via the mobile relay 520.

In the cases shown in FIGS. 3 to 5, the terminal may experience frequent handovers due to mobility of the terminal and the mobile relay. Here, the handover may include movement of the terminal between the base station and the mobile relay. In a communication environment having such the unreliable radio connections, the communication system may require methods for guaranteeing quality of service (QoS).

Meanwhile, the terminal may have several relays around it. In this case, in order to access a relay, the terminal may perform a procedure of discovering relays and a procedure of selecting a relay (i.e., relay (re-)selection). In this case, the terminal may measure received signal strengths of radio signals of the relays and select a relay to access based on the measured received signal strengths. Here, the radio signal may be a sidelink discovery message. The received signal strength may be a sidelink reference signal received power (SL-RSRP). The mobile relay may be classified into a layer 2 (L2) relay and a layer 3 (L3) relay in terms of a protocol structure.

Figure 6:
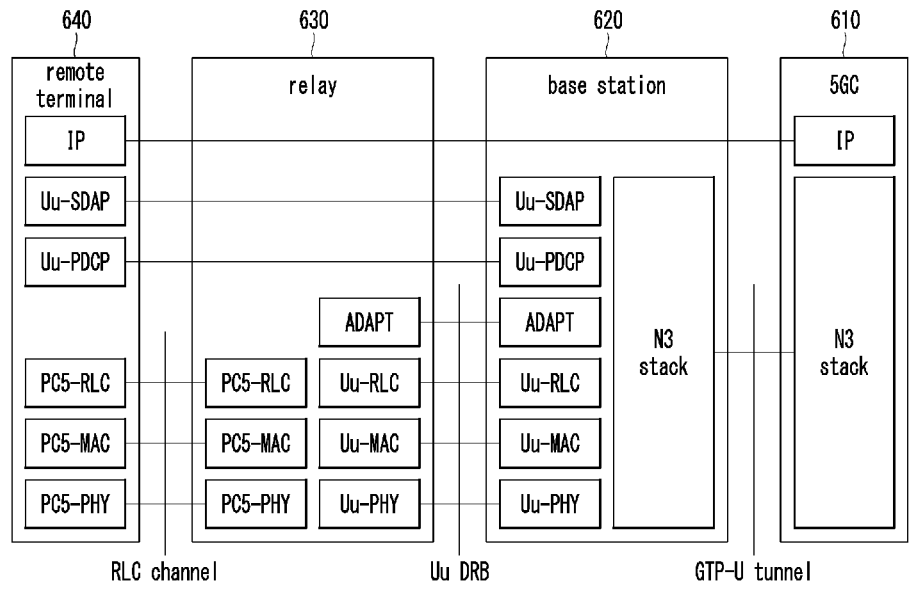
FIG. 6 is a conceptual diagram illustrating a first exemplary embodiment of a L2 relay protocol structure.

FIG. 6 is a conceptual diagram illustrating a first exemplary embodiment of a L2 relay protocol structure.

Referring to FIG. 6, in a L2 relay protocol structure, a fifth generation core network (5GC) 610 may include an Internet protocol (IP) layer and N3 stack. In addition, a base station 620 may include a Uu-physical (PHY) layer, Uu-medium access control (MAC) layer, Uu-radio link control (RLC) layer, adaptation (ADAPT) layer, Uu-packet data convergence protocol (PDCP) layer, UU-service data adaptation protocol (SDAP) layer, and N3 stack. The relay 630 may relay between a remote terminal 640 and the base station 620. The relay 630 may include a Uu-PHY layer, Uu-MAC layer, Uu-RLC layer, ADAPT layer, PC5-PHY layer, PC5-MAC layer, and PC5-RLC layer. In addition, the remote terminal 640 may include a PC5-PHY layer, PC5-MAC layer, PC5-RLC layer, Uu-PDCP layer, Uu-SDAP layer, and IP layer.

In this case, the 5GC 610 and the base station 620 may have a general packet radio service (GPRS) tunnel protocol-u (GTP-U) tunnel therebetween. In addition, the base station 620 and the relay 630 may have a Uu data radio bearer (DRB) based on a Uu interface therebetween. In addition, the relay 630 and the remote terminal 640 may have an RLC channel based on a PC5 interface therebetween. In the L2 relay protocol structure, the PHY layer to the RLC layer may exist in the relay 630. However, the PDCP layer and the SDAP layer may not exist in the relay 630, but exist in the base station 620 and the remote terminal 630 to terminate between the base station 620 and the remote terminal 630. Accordingly, the relay 630 may require the ADAPT layer for bearer mapping between the RLC channel and the Uu DRB.

Figure 7:
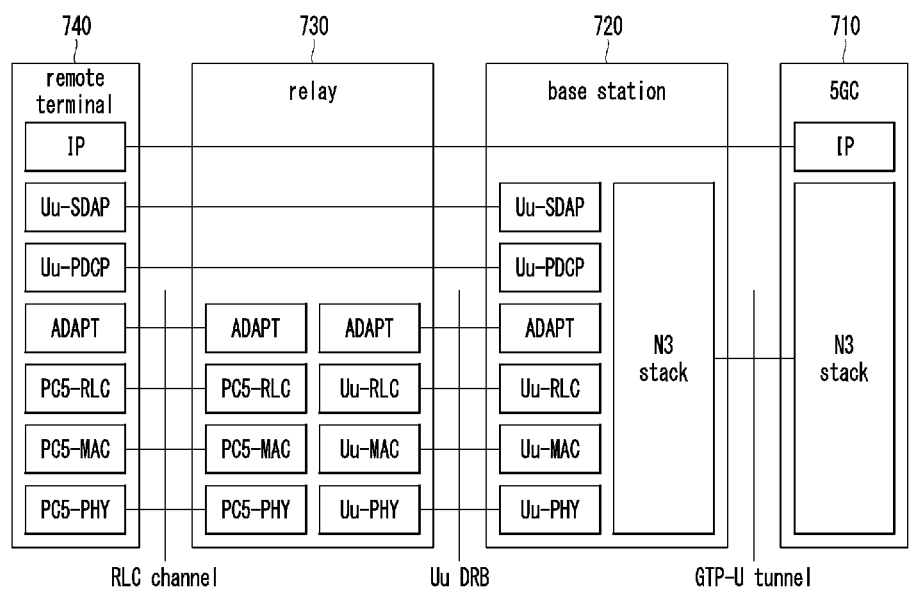
FIG. 7 is a conceptual diagram illustrating a second exemplary embodiment of a L2 relay protocol structure.

FIG. 7 is a conceptual diagram illustrating a second exemplary embodiment of a L2 relay protocol structure.

Referring to FIG. 7, in a L2 relay protocol structure, a 5GC 710 may include an IP layer and N3 stack. In addition, a base station 720 may include a Uu-PHY layer, Uu-MAC layer, Uu-RLC layer, ADAPT layer, Uu-PDCP layer, Uu-SDAP layer, and N3 stack. In addition, the relay 730 may relay between a remote terminal 740 and the base station 720. The relay 730 may include a Uu-PHY layer, Uu-MAC layer, Uu-RLC layer, pair of ADAPT layers, PC5-PHY layer, PC5-MAC layer, and PC5-RLC layer. In addition, the remote terminal 740 may include a PC5-PHY layer, PC5-MAC layer, PC5-RLC layer, ADAPT layer, Uu-PDCP layer, Uu-SDAP layer, and IP layer. In this case, a GTP-U tunnel may be provided between the 5GC 710 and the base station 720. In addition, the base station 720 and the relay 730 may have a Uu DRB based on a Uu interface therebetween. In addition, the relay 730 and the remote terminal 740 may have an RLC channel based on a PC5 interface therebetween.

In the L2 relay protocol structure, the PHY layer to the RLC layer may exist in the relay 730. However, the PDCP layer and the SDAP layer may not exist in the relay 730, but exist in the base station 720 and the remote terminal 740 to terminate between the base station 720 and the remote terminal 740. Accordingly, the relay 730 may require a pair of ADAPT layers for bearer mapping between the RLC channel and the Uu DRB.

Figure 8:
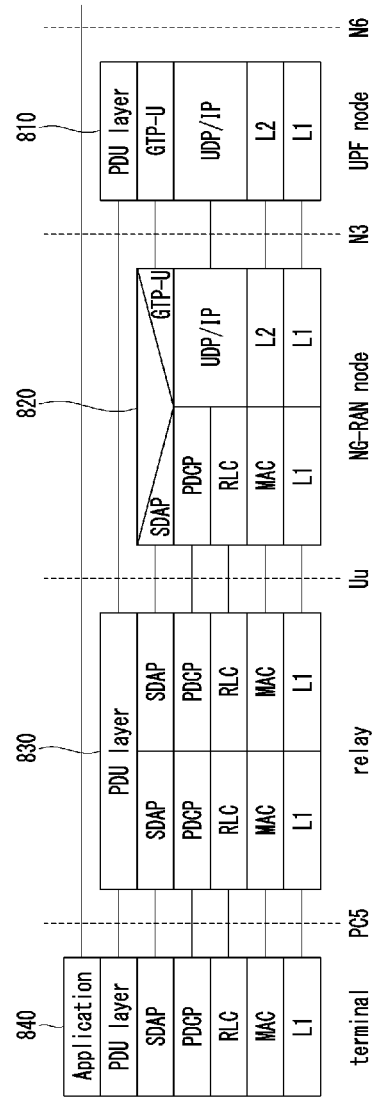
FIG. 8 is a conceptual diagram illustrating a first exemplary embodiment of a layer 3 (L3) relay protocol structure.

FIG. 8 is a conceptual diagram illustrating a first exemplary embodiment of a layer 3 (L3) relay protocol structure.

Referring to FIG. 8, in a L3 relay protocol structure, a user plane function (UPF) node 810 may include a layer 1 (L1) layer, L2 layer, user datagram protocol (UDP)/IP layer, GTP-U layer, and protocol data unit (PDU) layer. Such the UPF node 810 may communicate with an upper network device using an N6 interface. In addition, an NG radio access network (NG-RAN) node 820 may include a L1 layer, L2 layer, UDP/IP layer, and GTP-U layer for communicating with the UPF node 810. In addition, the NG-RAN node 820 may include a L1 layer, MAC layer, RLC layer, PDCP layer, and SDAP layer for communicating with a relay 830. The NG-RAN node 820 and the UPF node 810 may communicate using an N3 interface. Meanwhile, the relay 830 may relay between the terminal 840 and the NG-RAN node 820. Such the relay 830 may include a L1 layer, MAC layer, RLC layer, PDCP layer, and SDAP layer for communicating with the NG-RAN node 820. In addition, the relay 830 may include a L1 layer, MAC layer, RLC layer, PDCP layer, and SDAP layer for communicating with the terminal 840. In addition, the relay 830 may include a PDU layer for communicating with the UPF node 810. The relay 830 and the NG-RAN node 820 may communicate using a Uu interface. In addition, the terminal 840 may include a L1 layer, MAC layer, RLC layer, PDCP layer, SDAP layer, PDU layer, and application layer. The terminal 840 and the relay 830 may communicate using a PC5 interface.

In the L3 relay protocol structure, all radio protocols of the terminal may be terminated at the relay, and a separate radio protocol may exist between the relay and the network. Accordingly, the L3 relay protocol structure may not require a separate ADAPT layer because mapping between the PC5 interface and the Uu bearer is performed in form of IP packets.

Meanwhile, in the present disclosure, the terminal may simultaneously configure two radio links with the base station through the mobile relay. As such, the terminal may simultaneously configure two radio links with the base station through the mobile relay, so that the terminal may be dual-connected to the network side. Accordingly, the base station and the mobile relay may transmit data to the terminal in duplicate by applying a packet duplication function. In this manner, since the base station and the mobile relay can transmit data to the terminal in duplicate, it may be possible to increase the communication reliability in the radio sections and reduce a service interruption phenomenon during handover. The protocol structures presented in the present disclosure are all based on user planes, but may be equally applicable to control planes. Since methods proposed in the present disclosure are applied to a mobile relay having mobility, when referred to as a relay, it may mean a mobile relay. Dual connectivity (DC) and packet duplication (PD) referred to in the present disclosure may refer to schemes included in the 3GPP specifications. Various functions for supporting URLLC services may be included in the 3GPP specifications. In the 3GPP, the PD function may be considered in the L2 layer. Such the PD function may be a scheme of configuring two independent radio bearers (RBs) in the PDCP layer to transmit the same PDCP PDU to the respective radio bearers. Such the PD function may be a type of selection diversity scheme in which data transmission is performed by successfully transmitting a packet through one radio link even when a packet loss occurs in another radio link. Such the PD function have been proposed to support services requiring high reliability in a higher layer.

The communication system may configure two independent radio links to implement the PD function. In the 3GPP, the PD function may be implemented based on DC or carrier aggregation (CA). In the case of CA, two radio links may be configured on two component carriers (CC) configured in one base station. In the case of DC, two radio links may be configured through a base station serving as a master cell group (MCG) and a base station serving as a secondary cell group (SCG). In such the situation, the PDCP layer may serve as an anchor for two radio links generated through DC or CA. That is, two radio links may be branched at the PDCP layer of the transmitting end. In addition, two radio links may be combined at the PDCP layer of the receiving end. The PDCP layer may transmit different data through two radio links. Alternatively, the PDCP layer may transmit the same data in duplicate through two radio links. In the 3GPP specifications, the former case may be referred to as a case of using split bearers, and the latter may be referred to as a case of using duplication bearers. When the base station transmits data using split bearers, data transmission rate improvement may be expected. In addition, when the base station transmits data by applying duplication bearers, reliability improvement may be expected.

Figure 9:
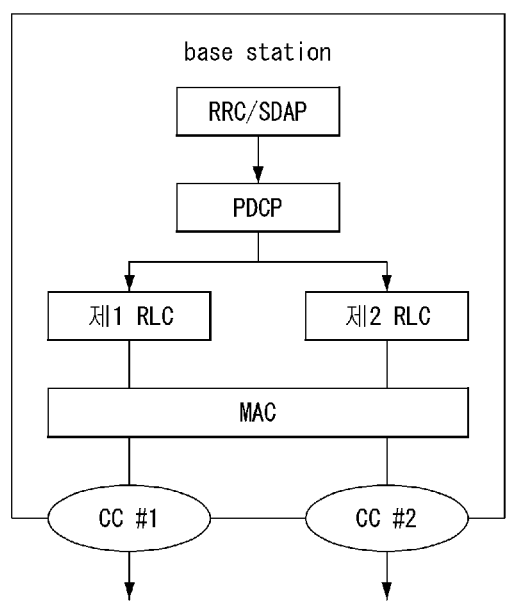
FIG. 9 is a conceptual diagram illustrating a first exemplary embodiment of a CA-based duplicate packet transmission process.

FIG. 9 is a conceptual diagram illustrating a first exemplary embodiment of a CA-based duplicate packet transmission process.

Referring to FIG. 9, for CA-based duplicate packet transmission, a base station may configure a first radio link by using an RRC/SDAP layer, a PDCP layer, a first RLC layer, and a MAC layer on a component carrier #1 (i.e., CC #1). In addition, the base station may configure a second radio link by using the RRC/SDAP layer, the PDCP layer, a second RLC layer, and the MAC layer on a component carrier #2 (i.e., CC #2). The PDCP layer of the base station may transmit different data through the first radio link and the second radio link. Alternatively, the PDCP layer may transmit the same data in duplicate through the first radio link and the second radio link.

Figure 10:
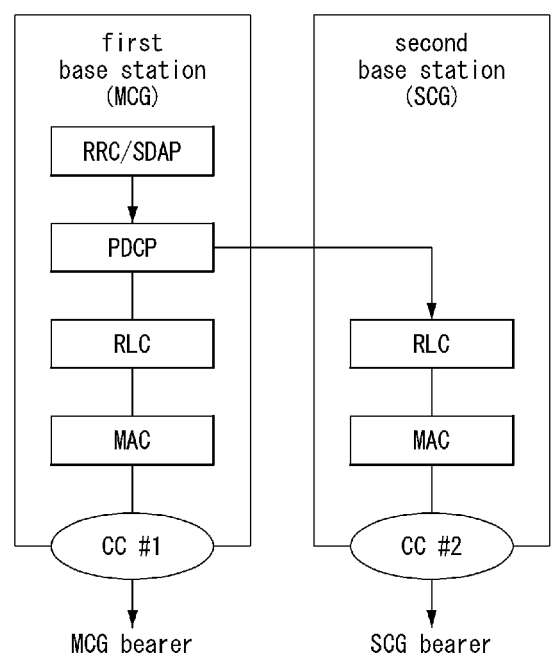
FIG. 10 is a conceptual diagram illustrating a first exemplary embodiment of DC-based duplicate packet transmission process.

FIG. 10 is a conceptual diagram illustrating a first exemplary embodiment of DC-based duplicate packet transmission process.

Referring to FIG. 10, for DC-based duplicate packet transmission, a first base station serving as an MCG may configure a first radio link by using an RRC/SDAP layer of the first base station, a PDCP layer of the first base station, an RLC layer of the first base station, and a MAC layer of the first base station on a component carrier #1 (i.e., CC #1) of the first base station. In addition, the first base station serving as the MCG may cooperate with a second base station serving as an SCG to configure a second radio link by using the RRC/SDAP layer of the first base station, the PDCP layer of the first base station, an RLC layer of the second base station, and a MAC layer of the second base station on a component carrier #2 (i.e., CC #2) of the second base station. The PDCP layer of the first base station may transmit different data through the first radio link and the second radio link. Alternatively, the PDCP layer of the first base station may transmit the same data in duplicate through the first radio link and the second radio link.

In the mobile relay structure to be dealt with in the present disclosure, the DC-based duplicate transmission may be applied because the base station and the relay exist in different locations. In order to apply the DC-based duplicate transmission function in the mobile relay structure, the PDCP layer may serve as an anchor. That is, two radio links may be branched at the PDCP layer of at the transmitting end. In addition, the two radio links may be combined at the PDCP layer of the receiving end. Accordingly, the mobile relay structure of the present disclosure may use the L2 relay structure.

Referring to FIGS. 6 and 7, in the L2 relay structure, the relay may form a protocol stack below the PDCP layer and may not newly form a protocol stack above the PDCP layer. Accordingly, the base station and the terminal may use the PDCP layer already existing in the base station as an anchor for two radio links. The mobile relay structure of the present disclosure may consider both an ADAPT layer supporting a PC5 interface and an ADAPT layer not supporting a PC5 interface as shown in FIGS. 6 and 7. In the present disclosure, the mobile relay structure may be illustrated based on the ADAPT layer not supporting a PC5 interface. However, the methods presented in the present disclosure may be applicable to both cases. The terminal may simultaneously access the base station through a Uu interface and a PC5 interface via the relay in various ways.

Figure 11:
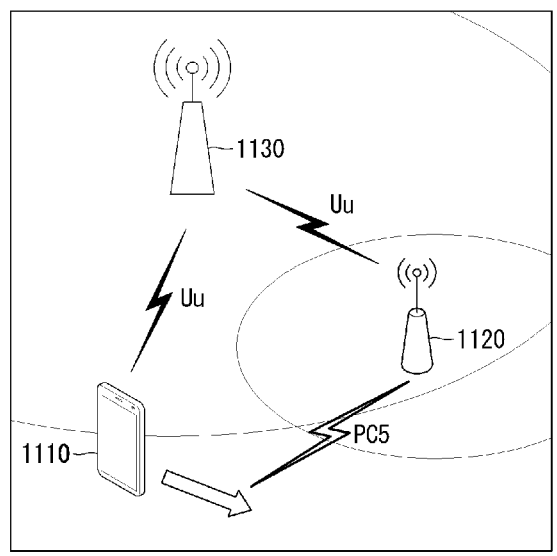
FIG. 11 is a conceptual diagram illustrating a first exemplary embodiment of a DC method in a communication system.

FIG. 11 is a conceptual diagram illustrating a first exemplary embodiment of a DC method in a communication system.

Referring to FIG. 11, in a DC method, a terminal 1110 may newly access a relay 1120 through a PC5 interface while being connected to a base station 1130 through a Uu interface. In this case, the terminal 1110 may not release the connection with the base station 1130 through the Uu interface. In this manner, the terminal 1110 may configure two radio links by creating a connection with the relay 1120 while maintaining the connection with the base station 1130. In this case, the relay 1120 may be connected to the base station 1130 through a Uu interface. Accordingly, PDCP layers of the base station 1130 and the terminal 1110 may perform an anchor function for two radio links. Here, the radio link formed between the base station 1130 and the terminal 1110 may correspond to an MCG bearer in the DC structure. The radio link formed between the relay 1120 and the terminal 1110 may correspond to an SCG bearer in the DC structure.

Figure 12:
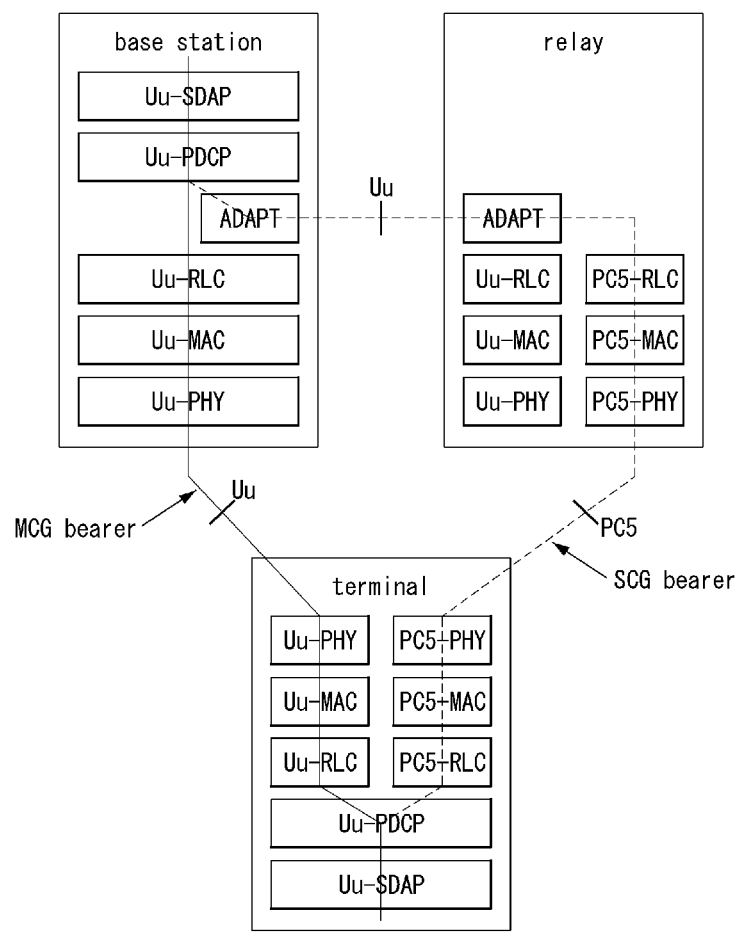
FIG. 12 is a conceptual diagram illustrating a first exemplary embodiment of a protocol structure for the case of FIG. 11.

FIG. 12 is a conceptual diagram illustrating a first exemplary embodiment of a protocol structure for the case of FIG. 11.

Referring to FIG. 12, in a protocol structure for the case of FIG. 11, the base station may be connected to the terminal through the Uu interface. The base station and the terminal may form a first radio link through a Uu-SDAP layer of the base station, Uu-PDCP layer of the base station, Uu-RLC layer of the base station, Uu-MAC layer of the base station, Uu-PHY layer of the base station, Uu-PHY layer of the terminal, Uu-MAC layer of the terminal, Uu-RLC layer of the terminal, Uu-PDCP layer of the terminal, and Uu-SDAP layer of the terminal. On the other hand, the base station may be connected to the relay through the Uu interface, and the relay may be connected to the terminal through the PC5 interface. In the above situation, the base station, the relay, and the terminal may form a second radio link through the Uu-SDAP layer of the base station, Uu-PDCP layer of the base station, ADAPT layer of the base station, ADAPT layer of the relay, PC5-RLC layer of the relay, PC5-MAC layer of the relay, PC5-PHY layer of the terminal, PC5-PHY layer of the terminal, PC5-MAC layer of the terminal, PC5-RLC layer of the terminal, Uu-PDCP layer of the terminal, and Uu-SDAP layer of the terminal. As such, the Uu-PDCP layer in the base station and the Uu-PDCP layer in the terminal may perform an anchor function for the first radio link and the second radio link.

Figure 13:
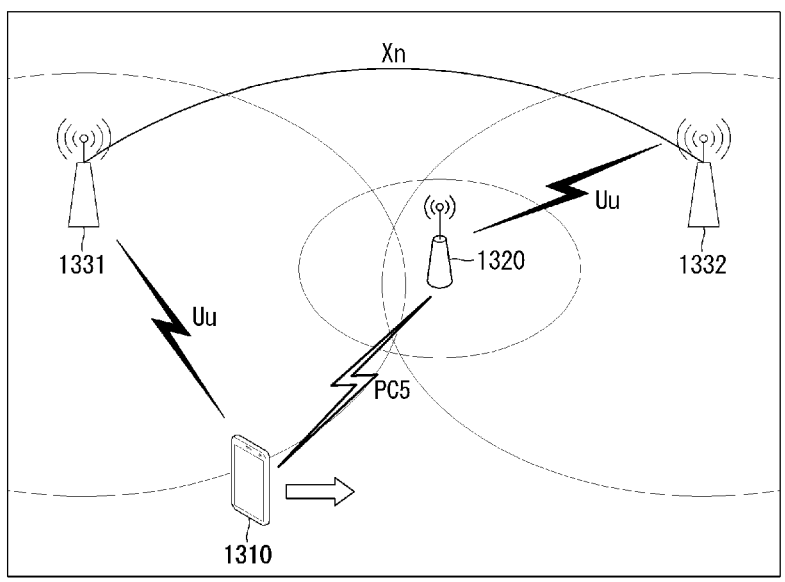
FIG. 13 is a conceptual diagram illustrating a second exemplary embodiment of a DC method in a communication system.

FIG. 13 is a conceptual diagram illustrating a second exemplary embodiment of a DC method in a communication system.

Referring to FIG. 13, in a DC method, a terminal 1310 may newly access a relay 1320 through a PC5 interface while being connected to a first base station 1331 through a Uu interface. In this case, the terminal 1310 may not release the connection with the first base station 1331 through the Uu interface. In this manner, the terminal 1310 may configure two radio links by creating a connection with the relay 1320 while maintaining the connection with the first base station 1331. In this case, the relay 1320 may be connected to a second base station 1332 through a Uu interface. In addition, the first base station 1331 and the second base station 1332 may be connected through an Xn interface. As such, when the first base station 1331 and the second base station 1332 are connected through the Xn interface, a radio link may be formed through the Xn interface. As a result, the first base station 1331 and the second base station 1332 may apply DC and duplicate transmission function. Accordingly, the PDCP layers of the first base station 1331 and the terminal 1310 may perform an anchor function for two radio links.

On the other hand, when the first base station 1331 and the second base station 1332 are not connected through an Xn interface, a structure corresponding to an SCG bearer may not be formed. Here, the radio link formed between the first base station 1331 and the terminal 1310 may correspond to an MCG bearer in the DC structure. In addition, the radio link formed between the relay 1320 and the terminal 1310 may correspond to an SCG bearer in the DC structure. Meanwhile, in the mobile relay structure, a plurality of base stations may be connected by Xn interfaces between the first base station 1331 to which the terminal 1310 is connected and the second base station 1332 to which the relay 1320 is connected. In this case, when the first base station 1331 and the second base station 1332 communicate through the plurality of base stations through the Xn interfaces, a latency may increase. Accordingly, in the mobile relay structure, the number of base stations located between the first base station 1331 and the second base station 1332 may be minimized as much as possible.

Figure 14:
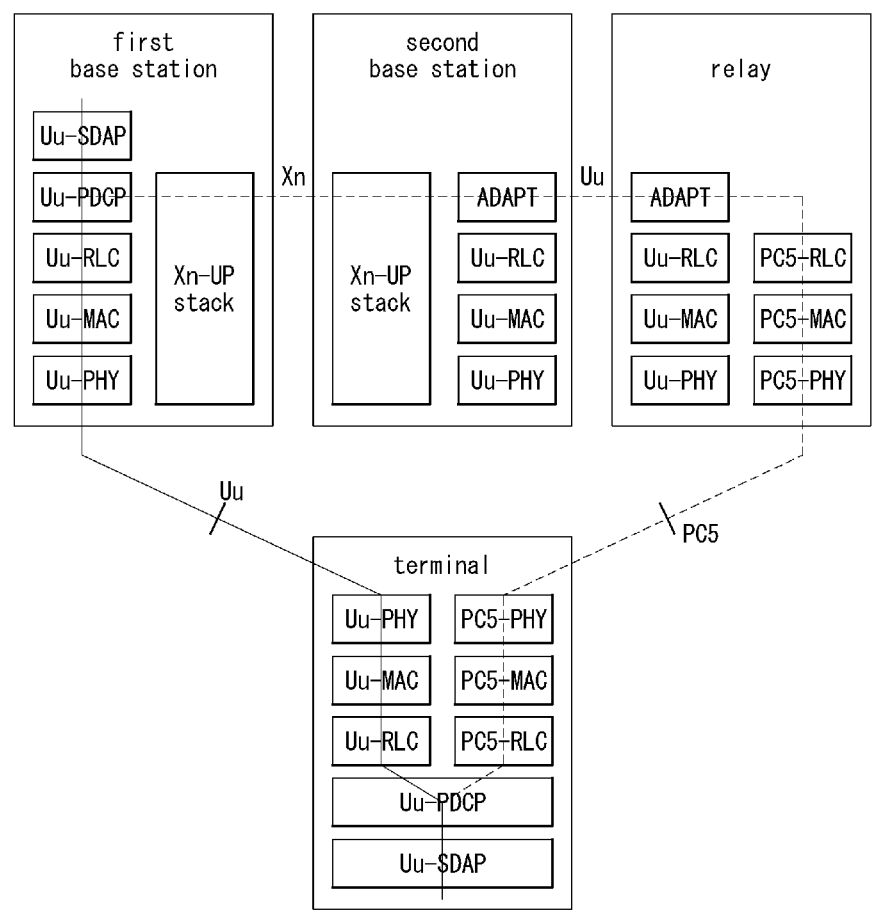
FIG. 14 is a conceptual diagram illustrating a first exemplary embodiment of a protocol structure for the case of FIG. 13.

FIG. 14 is a conceptual diagram illustrating a first exemplary embodiment of a protocol structure for the case of FIG. 13.

Referring to FIG. 14, in a protocol structure, the first base station may be connected to the terminal through the Uu interface. The first base station and the terminal may form a first radio link through a Uu-SDAP layer of the first base station, Uu-PDCP layer of the first base station, Uu-RLC layer of the first base station, Uu-MAC layer of the first base station, Uu-PHY layer of the first base station, Uu-PHY layer of the terminal, Uu-MAC layer of the terminal, Uu-RLC layer of the terminal, Uu-PDCP layer of the terminal, and Uu-SDAP layer of the terminal. On the other hand, the first base station may be connected to the second base station through the Xn interface. The second base station may be connected to the relay through the Uu interface, and the relay may be connected to the terminal through the PC5 interface. In the above situation, the first base station, the second base station, the relay, and the terminal may form a second radio link through the Uu-SDAP layer of the first base station, Uu-PDCP layer of the first base station, ADAPT layer of the second base station, ADAPT layer of the relay, PC5-RLC layer of the relay, PC5-MAC layer of the relay, PC5-PHY layer of the relay, PC5-PHY layer of the terminal, PC5-MAC layer of the terminal, PC5-RLC layer of the terminal, Uu-PDCP layer of the terminal, and Uu-SDAP layer of the terminal. As such, the Uu-PDCP layer in the first base station and the Uu-PDCP layer in the terminal may perform an anchor function for the first radio link and the second radio link.

Figure 15:
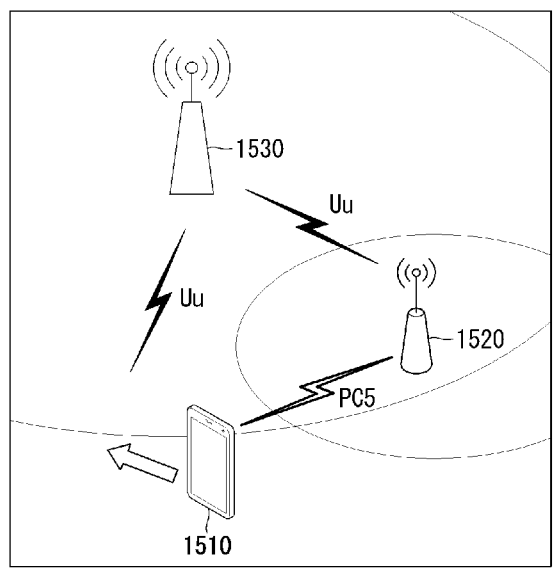
FIG. 15 is a conceptual diagram illustrating a third exemplary embodiment of a DC method in a communication system.

FIG. 15 is a conceptual diagram illustrating a third exemplary embodiment of a DC method in a communication system.

Referring to FIG. 15, in a DC method, a terminal 1510 may newly access a base station 1530 through a Uu interface while being connected to a relay 1520 through a PC5 interface. In this case, the terminal 1510 may not release the connection with the relay 1520 through the PC5 interface. As such, the terminal 1510 may configure two radio links by creating a connection with the base station 1530 while maintaining the connection with the relay 1520. In this case, the relay 1520 may be connected to the base station 1530 through a Uu interface. Accordingly, PDCP layers of the base station 1530 and the terminal 1510 may perform an anchor function for two radio links. Here, the radio link formed between the relay 1520 and the terminal 1510 may correspond to an MCG bearer in the DC structure. The radio link formed between the base station and the terminal may correspond to an SCG bearer in the DC structure. That is, a radio link formed earlier may operate as an MCG bearer, and a radio link added later may operate as an SCG bearer.

Figure 16:
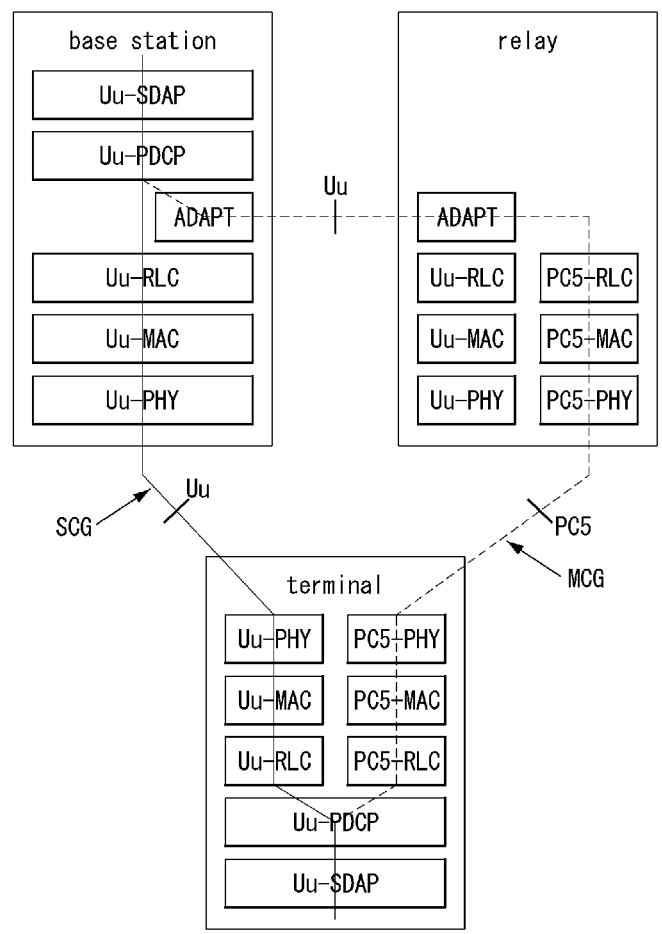
FIG. 16 is a conceptual diagram illustrating a first exemplary embodiment of a protocol structure for the case of FIG. 15.

FIG. 16 is a conceptual diagram illustrating a first exemplary embodiment of a protocol structure for the case of FIG. 15.

Referring to FIG. 16, in a protocol structure, the base station may be connected to the relay through the Uu interface, and the relay may be connected to the terminal through the PC5 interface. In the above situation, the base station, the relay, and the terminal may form a first radio link through a Uu-SDAP layer of the base station, Uu-PDCP layer of the base station, ADAPT layer of the base station, ADAPT layer of the relay, PC5-RLC layer of the relay, PC5-MAC layer of the relay, PC5-PHY layer of the relay, PC5-PHY layer of the terminal, PC5-MAC layer of the terminal, PC5-RLC layer of the terminal, Uu-PDCP layer of the terminal, and Uu-SDAP layer of the terminal.

Thereafter, the base station may be connected to the terminal through the Uu interface. The base station and the terminal may form a second radio link through the Uu-SDAP layer of the base station, Uu-PDCP layer of the base station, Uu-RLC layer of the base station, Uu-MAC layer of the base station, Uu-PHY layer of the base station, Uu-PHY layer of the terminal, Uu-MAC layer of the terminal, Uu-RLC layer of the terminal, Uu-PDCP layer of the terminal, and Uu-SDAP layer of the terminal. As such, the Uu-PDCP layer in the base station and the Uu-PDCP layer in the terminal may perform an anchor function for the first radio link and the second radio link. Here, the first radio link formed between the relay and the terminal may correspond to an MCG bearer in the DC structure. The second radio link formed between the base station and the terminal may correspond to an SCG bearer in the DC structure. That is, the first radio link formed earlier may operate as an MCG bearer, and the second radio link added later may operate as an SCG bearer.

Figure 17:
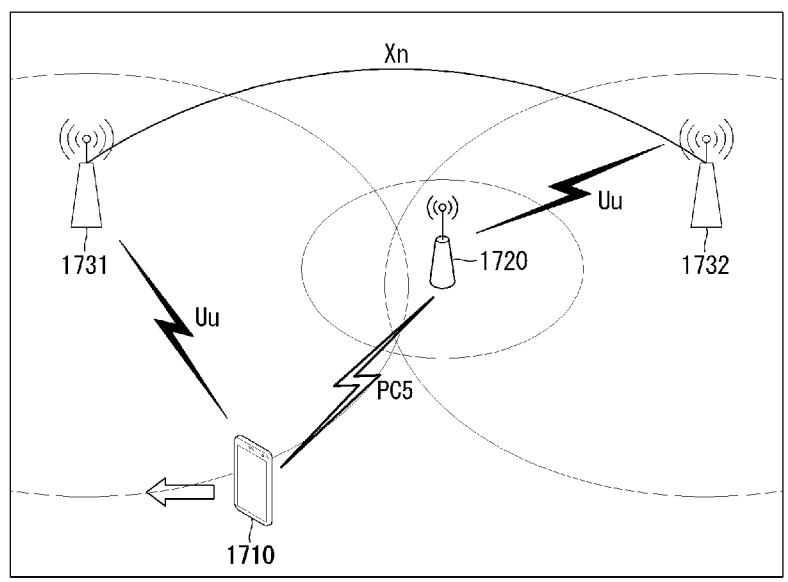
FIG. 17 is a conceptual diagram illustrating a fourth exemplary embodiment of a DC method in a communication system.

FIG. 17 is a conceptual diagram illustrating a fourth exemplary embodiment of a DC method in a communication system.

Referring to FIG. 17, in a DC method, a terminal 1710 may newly access a first base station 1731 through a Uu interface while being connected to a relay 1720 through a PC5 interface. In this case, the terminal 1710 may not release the connection with the relay 1720 through the PC5 interface. As such, the terminal 1710 may configure two radio links by creating a connection with the first base station 1731 while maintaining the connection with the relay 1720. In this case, the relay 1720 may be connected to a second base station 1732 through a Uu interface. In addition, the first base station 1731 and the second base station 1732 may be connected through an Xn interface. When the first base station 1731 and the second base station 1732 are connected through the Xn interface, a radio link may be formed through the Xn interface, so that the DC and duplicate transmission function may be applied. Accordingly, PDCP layers of the second base station 1732 and the terminal 1710 may perform an anchor function for two radio links.

On the other hand, when the first base station 1731 and the second base station 1732 are not connected through an Xn interface, a structure corresponding to an MCG bearer may not be formed. Here, the radio link formed between the relay 1720 and the terminal 1710 may correspond to an MCG bearer in the DC structure. The radio link formed between the first base station 1731 and the terminal 1710 may correspond to an SCG bearer in the DC structure. Meanwhile, in the mobile relay structure, a plurality of base stations may be connected by Xn interfaces between the first base station 1731 to which the terminal 1710 is connected and the second base station 1732 to which the relay 1720 is connected. In this case, when the first base station 1731 and the second base station 1732 communicate through the plurality of base stations by using the Xn interfaces, a latency may increase. Accordingly, in the mobile relay structure, the number of base stations located between the first base station 1731 and the second base station 1732 may be minimized as much as possible.

Figure 18:
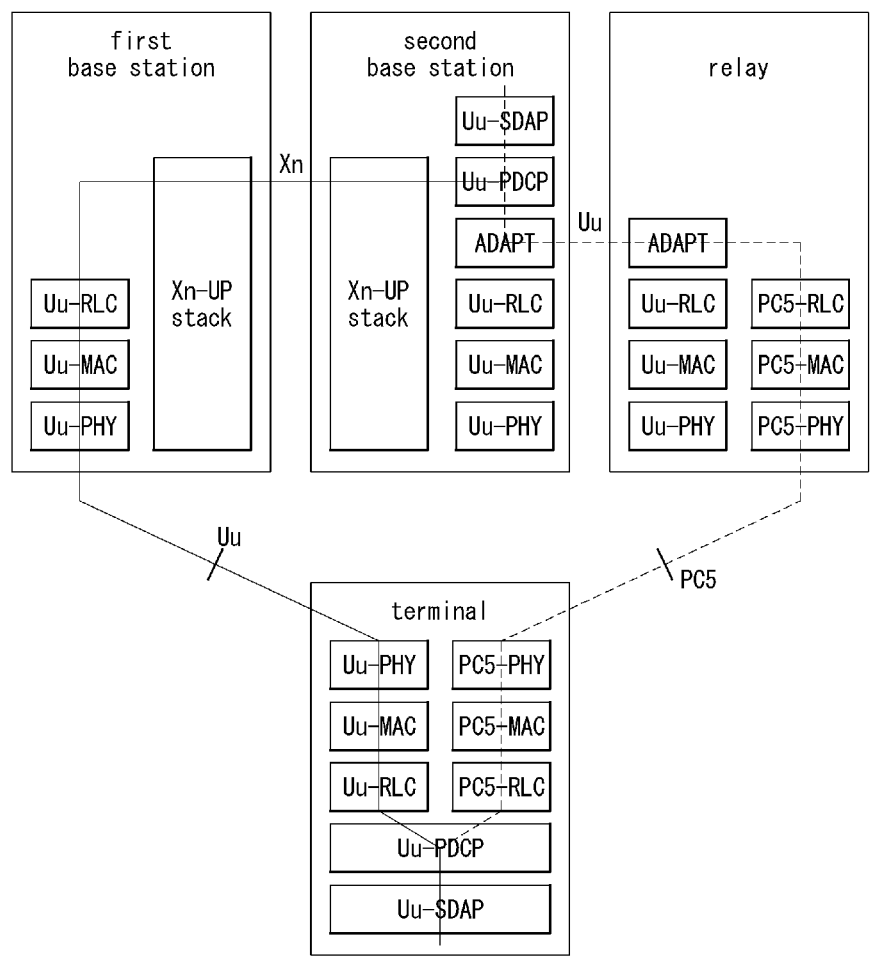
FIG. 18 is a conceptual diagram illustrating a first exemplary embodiment of a protocol structure for the case of FIG. 17.

FIG. 18 is a conceptual diagram illustrating a first exemplary embodiment of a protocol structure for the case of FIG. 17.

Referring to FIG. 18, in a protocol structure, the second base station and the relay may be connected through the Uu interface. The relay and the terminal may be connected through the PC5 interface. In the above situation, the second base station, the relay, and the terminal may form a first radio link through a Uu-SDAP layer of the second base station, Uu-PDCP layer of the second base station, ADAPT layer of the second base station, ADAPT layer of the relay, PC5-RLC layer of the relay, PC5-MAC layer of the relay, PC5-PHY layer of the relay, PC5-PHY layer of the terminal, PC5-MAC layer of the terminal, PC5-RLC layer of the terminal, Uu-PDCP layer of the terminal, and Uu-SDAP layer of the terminal. Meanwhile, the first base station and the second base station may be connected through an Xn interface. Thereafter, the terminal may be connected to the first base station through the Uu interface. In addition, the first base station may be connected to the second base station through the Xn interface. Accordingly, the second base station, the first base station, and the terminal may form a second radio link through the Uu-SDAP layer of the second base station, Uu-PDCP layer of the second base station, Uu-RLC layer of the first base station, Uu-MAC layer of the first base station, Uu-PHY layer of the first base station, Uu-PHY layer of the terminal, Uu-MAC layer of the terminal, Uu-RLC layer of the terminal, Uu-PDCP layer of the terminal, and Uu-SDAP layer of the terminal. As such, the Uu-PDCP layers in the second base station and the Uu-PDCP layer in the terminal may perform an anchor function for the first radio link and the second radio link.

Figure 19:
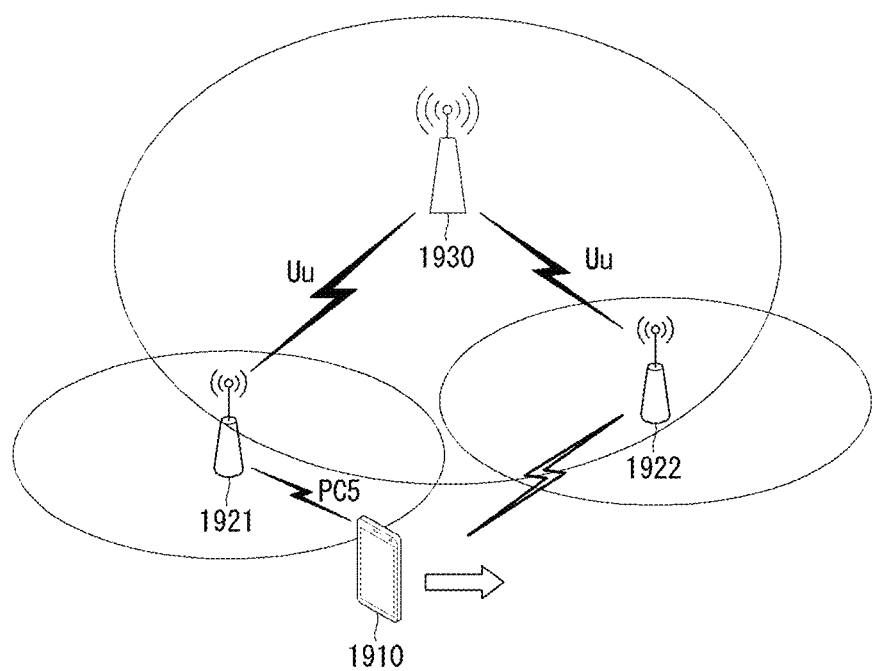
FIG. 19 is a conceptual diagram illustrating a fifth exemplary embodiment of a DC method in a communication system.

FIG. 19 is a conceptual diagram illustrating a fifth exemplary embodiment of a DC method in a communication system.

Referring to FIG. 19, in a DC method, a terminal may access a second relay 1922 through a PC5 interface while being connected to a first relay 1921 through a PC5 interface. In this case, the terminal 1910 may access the second relay 1922 through the PC5 interface without releasing the connection with the first relay 1921 through the PC5 interface. As such, the terminal 1910 may configure two radio links by creating a connection with the second relay 1922 while maintaining the connection with the first relay 1921. In this case, the first relay 1921 may be connected to a base station 1930 through a Uu interface. In addition, the second relay 1922 may be connected to the base station 1930 through a Uu interface. Accordingly, the PDCP layers of the base station 1930 and the terminal 1910 may perform an anchor function for two radio links. Here, the radio link formed between the first relay 1921 and the terminal 1910 may correspond to an MCG bearer in the DC structure. The radio link formed between the second relay 1922 and the terminal 1910 may correspond to an SCG bearer in the DC structure.

Figure 20:
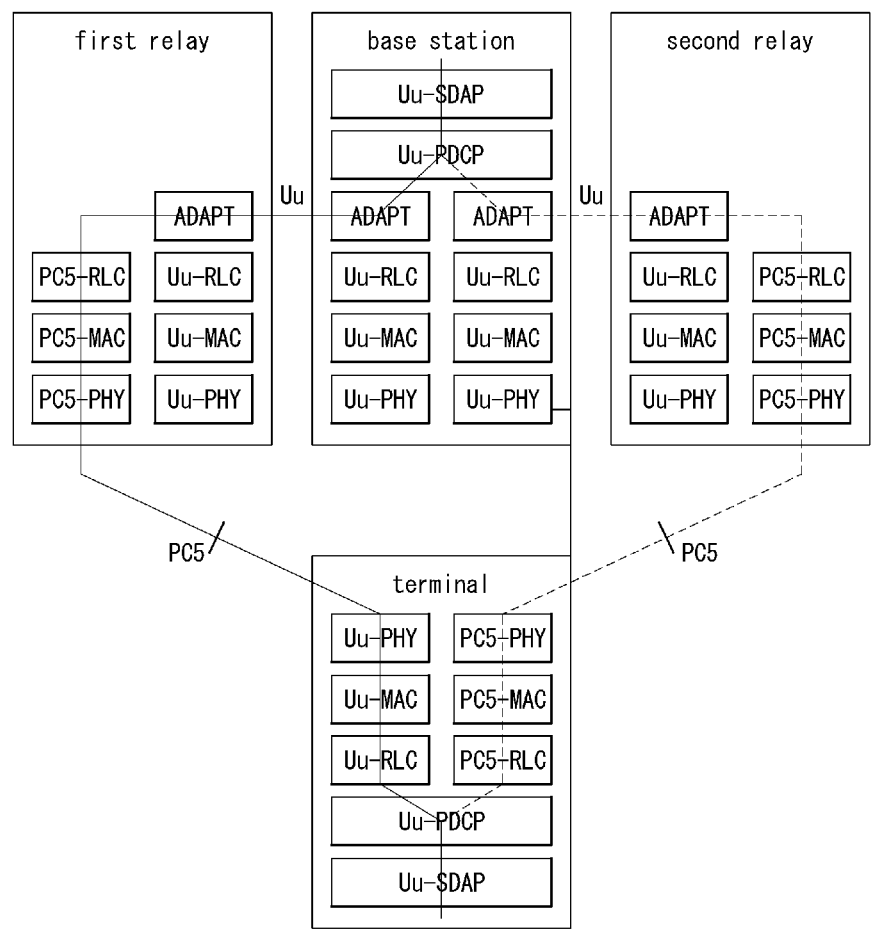
FIG. 20 is a conceptual diagram illustrating a first exemplary embodiment of a protocol structure for the case of FIG. 19.

FIG. 20 is a conceptual diagram illustrating a first exemplary embodiment of a protocol structure for the case of FIG. 19.

Referring to FIG. 20, in a protocol structure, the base station may be connected to the first relay through the Uu interface. In addition, the first relay may be connected to the terminal through the PC5 interface. In the above situation, the base station, the first relay, and the terminal may form a first radio link through a Uu-SDAP layer of the base station, Uu-PDCP layer of the base station, first ADAPT layer of the base station, ADAPT layer of the first relay, PC5-RLC layer of the first relay, PC5-MAC layer of the first relay, PC5-PHY layer of the first relay, first PC5-PHY layer of the terminal, first PC5-MAC layer of the terminal, first PC5-RLC layer of the terminal, Uu-PDCP layer of the terminal, and Uu-SDAP layer of the terminal.

Thereafter, the base station may be connected to the second relay through the Uu interface. In addition, the second relay may be connected to the terminal through the PC5 interface. In the above situation, the base station, the second relay, and the terminal may form a second radio link through the Uu-SDAP layer of the base station, Uu-PDCP layer of the base station, second ADAPT layer of the base station, ADAPT layer of the second relay, PC5-RLC layer of the second relay, PC5-MAC layer of the second relay, PC5-PHY layer of the second relay, second PC5-PHY layer of the terminal, second PC5-MAC layer of the terminal, second PC5-RLC layer of the terminal, Uu-PDCP layer of the terminal, and Uu-SDAP layer of the terminal. As such, the Uu-PDCP layer in the base station and the Uu-PDCP layer in the terminal may perform an anchor function for the first radio link and the second radio link.

Figure 21:
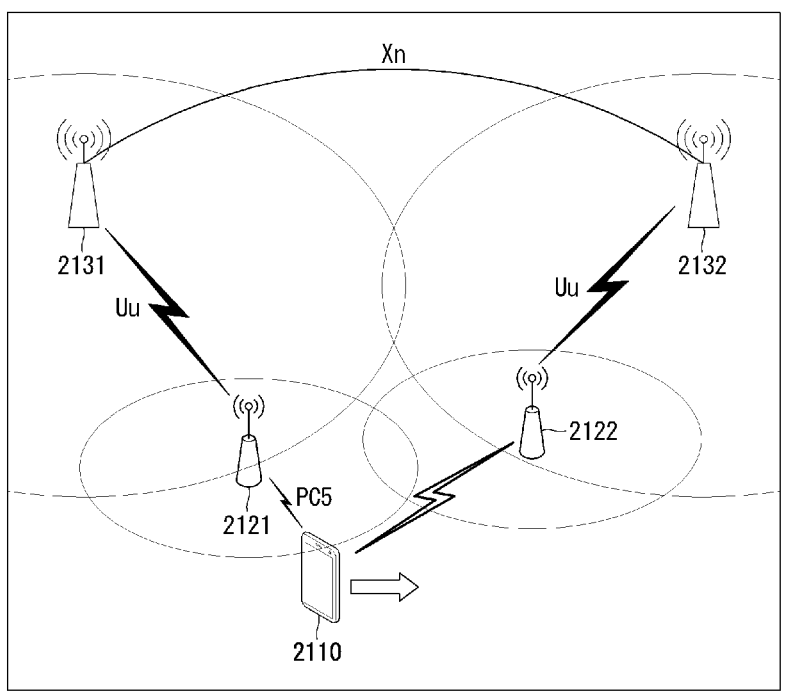
FIG. 21 is a conceptual diagram illustrating a sixth exemplary embodiment of a DC method in a communication system.

FIG. 21 is a conceptual diagram illustrating a sixth exemplary embodiment of a DC method in a communication system.

Referring to FIG. 21, in a DC method, a terminal 2110 may newly access a second relay 2122 through a PC5 interface while being connected to a first relay 2121 through a PC5 interface. In this case, the terminal 2110 may not release the connection with the first relay 2121 through the PC5 interface. In this manner, the terminal 2110 may configure two radio links by creating a connection with the second relay 2122 while maintaining the connection with the first relay 2121. In this case, the first relay 2121 may be connected to a first base station 2131 through a Uu interface. In addition, the second relay 2122 may be connected to a second base station 2132 through a Uu interface. In addition, the first base station 2131 and the second base station 2132 may be connected through an Xn interface. As such, when the first base station 2131 and the second base station 2132 are connected through the Xn interface, a radio link may be formed through the Xn interface, so that the DC and duplicate transmission functions may be applied. Accordingly, the PDCP layers of the first base station 2131 and the terminal 2110 may perform an anchor function for two radio links.

On the other hand, when the first base station 2131 and the second base station 2132 are not connected through an Xn interface, a structure corresponding to an MCG bearer may not be formed. Here, the radio link formed between the first relay 2121 and the terminal 2110 may correspond to an MCG bearer in the DC structure. The radio link formed between the second relay 2122 and the terminal 2110 may correspond to an SCG bearer in the DC structure. Meanwhile, in the mobile relay structure, a plurality of base stations may be connected between the first base station 2131 and the second base station 2132 through Xn interfaces. In this case, when the first base station 2131 and the second base station 2132 communicate through the plurality of base stations by using the Xn interfaces, a latency may increase. Accordingly, in the mobile relay structure, the number of base stations located between the first base station 2131 and the second base station 2132 may be minimized as much as possible.

Figure 22:
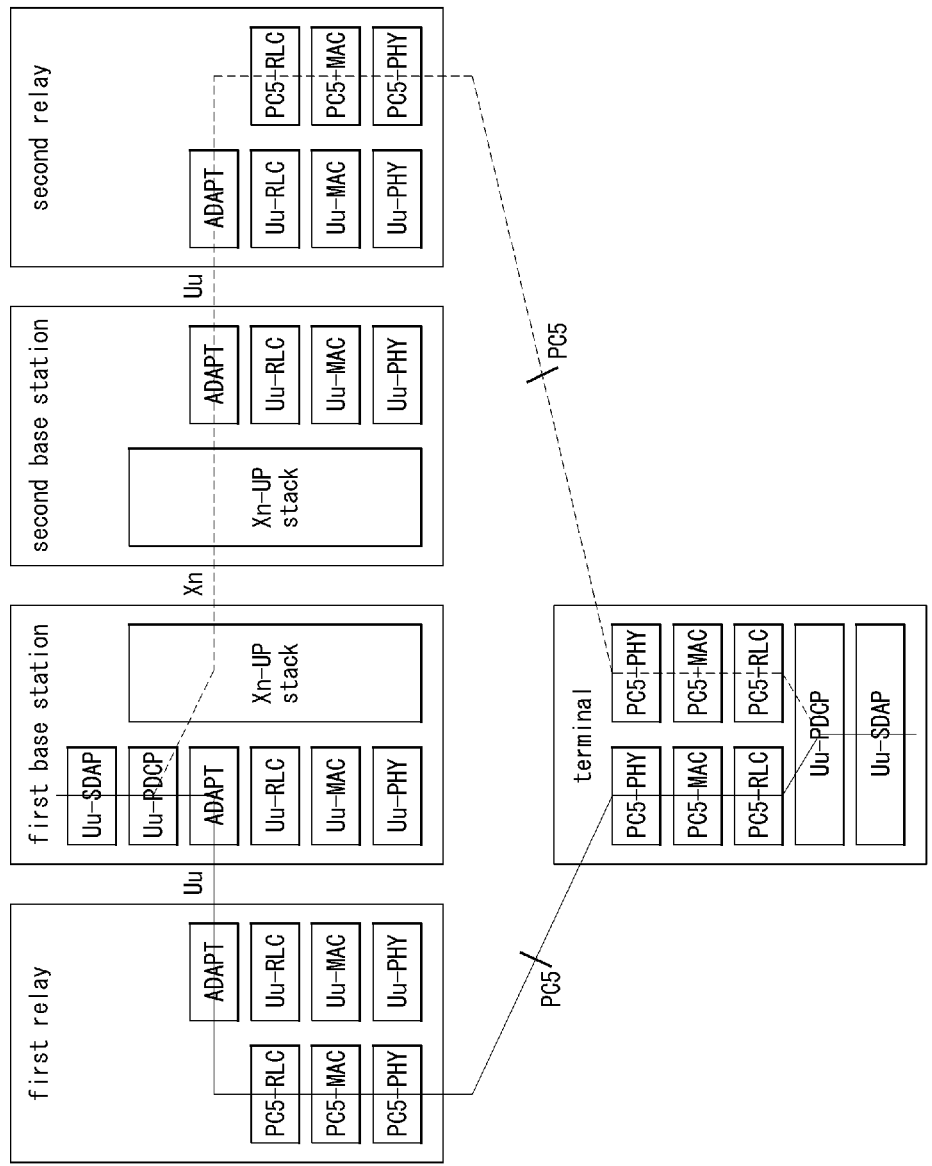
FIG. 22 is a conceptual diagram illustrating a first exemplary embodiment of a protocol structure for the case of FIG. 21.

FIG. 22 is a conceptual diagram illustrating a first exemplary embodiment of a protocol structure for the case of FIG. 21.

Referring to FIG. 22, in a protocol structure, the first base station and the first relay may be connected through the Uu interface. The first relay and the terminal may be connected through the PC5 interface. In the above situation, the first base station, the first relay, and the terminal may form a first radio link through a Uu-SDAP layer of the first base station, Uu-PDCP layer of the first base station, ADAPT layer of the first base station, ADAPT layer of the first relay, PC5-RLC layer of the first relay, PC5-MAC layer of the first relay, PC5-PHY layer of the first relay, first PC5-PHY layer of the terminal, first PC5-MAC layer of the terminal, first PC5-RLC layer of the terminal, Uu-PDCP layer of the terminal, and Uu-SDAP layer of the terminal.

Meanwhile, the first base station and the second base station may be connected through the Xn interface. The second base station may be connected to the second relay through the Uu interface. Thereafter, the terminal may be connected to the second relay through the PC5 interface. Accordingly, the first base station, the second base station, the second relay, and the terminal may form a second radio link through the Uu-SDAP layer of the first base station, Uu-PDCP layer of the first base station, ADAPT layer of the second base station, ADAPT layer of the second relay, PC5-RLC layer of the second relay, PC5-MAC layer of the second relay, PC5-PHY layer of the second relay, second PC5-PHY layer of the terminal, second PC5-MAC layer of the terminal, second PC5-RLC layer of the terminal, Uu-PDCP layer of the terminal, and Uu-SDAP layer of the terminal. As such, the Uu-PDCP layer in the first base station and the Uu-PDCP layer in the terminal may perform an anchor function for the first radio link and the second radio link.

As described above, the terminal may apply duplicate transmission by forming two radio links through the base station and the relay. To this end, the terminal or the relay may satisfy the following conditions.

Condition 1) The relay should be able to support the L2 relay structure.

Condition 2) The terminal should be able to support a dual active protocol stack (DAPS).

Condition 3) The base station to which the terminal is connected and the base station to which the relay is connected should be the same. Alternatively, when the base station to which the terminal is connected and the base station to which the relay is connected are different from each other, they should be connected through an Xn interface.

In general, a radio resource management (RRM) entity of the base station may perform a radio resource management function. Accordingly, the base station may determine whether to apply at least one of the methods of FIGS. 11 to 22. The terminal and the relay may report related information to the base station in order to support such the determination performed by the base station. That is, the terminal may report to the base station whether it can support a DAPS. In this case, the terminal may report whether it supports the DAPS to the base station through a procedure of reporting capability of the terminal to the base station. Then, the base station may receive the report indicating whether the terminal supports the DAPS from the terminal.

In addition, the base station may determine whether the terminal supports the DAPS based on the report received from the terminal. The base station may determine to apply at least one of the methods proposed in FIGS. 11 to 22 when the terminal supports the DAPS. Meanwhile, the relay may transmit information on whether it can operate in the L2 relay structure or the L3 relay structure to the base station. Then, the base station may receive information on whether the relay can operate in the L2 relay structure or the L3 relay structure from the relay. The base station may determine whether the terminal can operate in the L2 relay structure or the L3 relay structure based on the information received from the relay.

Meanwhile, the terminal may discover neighboring cells or relays based on measurement-related information configured by the base station. Then, the terminal may transmit a result of discovering neighboring cells or relays to the base station. As an example, the terminal may provide a relay list that is a list of discovered relays and received signal strength information for each relay to the base station. Then, the base station may receive the result of discovering the neighboring cells or relays from the terminal. In addition, the base station may determine which relay the corresponding terminal can access through a PC5 interface based on the result of discovering the neighboring cells or relays received from the terminal. In addition, the base station may determine whether to apply a DC transmission function while maintaining an existing Uu radio link.

When the base station wants to apply a DC transmission function, the base station may apply the DC transmission function by selecting a relay capable of DC from among the relays included in the relay list received from the terminal. In this case, when there are multiple relays capable of DC transmission, a relay having the largest received signal strength may be selected. That is, the base station may apply the DC transmission function by selecting a relay connected while supporting the L2 relay structure. In addition, the base station may apply DC by selecting a relay connected to another base station the can be connected through an Xn interface.

Figure 23:
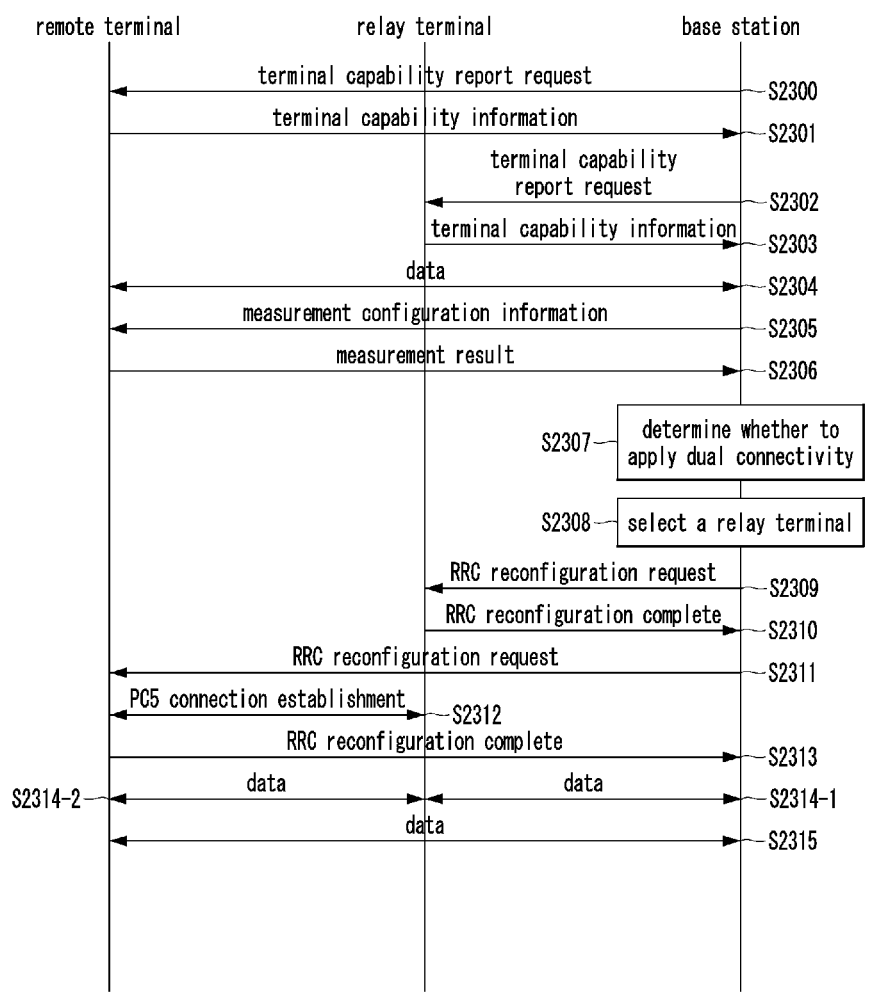
FIG. 23 is a sequence chart illustrating the first exemplary embodiment of the DC method in a communication system.

FIG. 23 is a sequence chart illustrating the first exemplary embodiment of the DC method in a communication system.

Referring to FIG. 23, in a DC method, a remote terminal may establish a radio resource control (RRC) connection with a base station. When the RRC connection is established and the remote terminal is in an RRC connected mode, the base station may transmit a terminal capability report request signal to the remote terminal (S2300). In this case, the base station may transmit the terminal capability report request signal to the remote terminal using a higher layer parameter used for the terminal capability report request. Accordingly, the remote terminal may receive the terminal capability report request signal from the base station, and the remote terminal may generate terminal capability information according to a specific procedure.

In this case, the remote terminal may include an indicator indicating whether or not it can support the DAPS in the terminal capability information. The remote terminal may transmit the terminal capability information including the indicator indicating whether the remote terminal supports the DAPS to the base station (S2301). Then, the base station may receive the terminal capability information from the remote terminal. Accordingly, the base station may identify whether the remote terminal supports the DAPS.

Meanwhile, a relay terminal may establish an RRC connection with the base station. The base station may transmit a terminal capability report request signal to the relay terminal when the relay terminal is in an RRC connected mode. In this case, the base station may transmit the terminal capability report request signal to the relay terminal using a higher layer parameter for the terminal capability report request (S2302). Accordingly, the relay terminal may receive the terminal capability report request signal from the base station, and the relay terminal may generate terminal capability information according to a specific procedure.

In this case, the relay terminal may include an indicator indicating whether the relay terminal support the L2 relay structure or the L3 relay structure. As such, the relay terminal may transmit the terminal capability information including the indicator indicating whether the relay terminal supports the L2 relay structure or the L3 relay structure to the base station (S2303). Then, the base station may receive the relay terminal capability information including the indicator indicating information indicating whether the relay terminal supports the L2 relay structure or the L3 relay structure from the remote terminal. Accordingly, the base station may identify whether the relay terminal supports the L2 relay structure or the L3 relay structure.

Meanwhile, the remote terminal may transmit data to the base station in a state in which the RRC connection with the base station is established. Then, the base station may receive the data from the remote terminal. In addition, the base station may transmit the data to the remote terminal, and the remote terminal may receive the data from the base station (S2304).

Meanwhile, the base station may transmit measurement configuration information to the remote terminal so as to perform measurement on relay terminals located in the vicinity (S2305). Then, the remote terminal may receive the measurement configuration information from the base station. In addition, the remote terminal may measure neighboring relay terminals according to the received measurement configuration information, and report a measurement result to the base station (S2306). In this case, the remote terminal may include a relay terminal list including information on the measured neighboring relay terminals, and/or signal level information or signal quality information of each relay terminal in the relay terminal list in the measurement result. In addition, the measurement result may include an identifier of each relay terminal. In addition, the measurement result may include signal level information or signal quality information for the base station. Here, the signal level information may be received signal strength information.

On the other hand, the base station may receive the measurement result from the remote terminal. Accordingly, the base station may obtain at least one of the relay terminal list, which is a list of relay terminals adjacent to the remote terminal, signal level information or signal quality information of each of the relay terminals in the relay terminal list, an identifier of each of the relay terminals, a signal level or signal quality for the base station, or combinations thereof.

Accordingly, the base station may identify whether at least one or more relay terminals having a signal level or signal quality greater than or equal to a first threshold exist based on the relay terminal list and the signal level information or signal quality information of each of the relays in the relay terminal list. When it is identified that at least one or more relay terminals having a signal level or signal quality equal to or greater than the first threshold exist, the base station may identify whether the corresponding at least one or more relay terminals support the L2 relay structure. The base station may determine to apply DC when at least one relay terminal supports the L2 relay structure (S2307).

In this case, the base station may proceed as described above after identifying that the remote terminal supports the DAPS.

In addition, when it is determined to apply DC, the base station may select any one relay terminal from among the relay terminals supporting the L2 relay structure, which are informed by the remote terminal (S2308). In this case, the base station may select a relay terminal having the best signal level or signal quality based on the signal levels or signal qualities of the respective relay terminals supporting the L2 relay structure.

Thereafter, the base station may reconfigure the RRC connection by performing an RRC reconfiguration procedure for the selected relay terminal to which DC is to be applied. That is, the base station may transmit an RRC reconfiguration request message to the relay terminal to which DC transmission is to be applied (S2309). Then, the relay terminal may receive the RRC reconfiguration request message from the base station. Accordingly, the relay terminal may perform RRC reconfiguration with the base station. Thereafter, the relay terminal may transmit an RRC reconfiguration complete message to the base station to complete the RRC reconfiguration procedure (S2310). Accordingly, the base station may receive the RRC reconfiguration complete message from the relay terminal.

Meanwhile, the base station may maintain the RRC connection with the remote terminal in order to apply DC. To this end, the base station may transmit an RRC reconfiguration request message to the remote terminal (S2311). Then, the remote terminal may receive the RRC reconfiguration request message from the base station. Accordingly, the remote terminal may perform RRC reconfiguration with the base station. In this case, the base station may request the remote terminal to access to the selected relay terminal by notifying information on the selected relay terminal (e.g., an identifier of the relay terminal). Then, the remote terminal may communicate with the relay terminal through a PC5 interface by establishing a PC5 connection with the relay terminal (S2312).

Thereafter, the remote terminal may transmit an RRC reconfiguration complete message to the base station to complete the RRC reconfiguration procedure (S2313). Accordingly, the base station may receive the RRC reconfiguration complete message from the remote terminal. In this manner, the remote terminal may maintain the RRC connected state by performing the RRC reconfiguration.

Thereafter, the base station may transmit data to the remote terminal through the relay terminal (S2314-1, S2314-2). Then, the remote terminal may receive the data transmitted through the relay terminal. In this case, the base station may directly transmit data to the remote terminal (S2315). Then, the remote terminal may receive the data directly from the base station. In this case, the data transmitted directly by the base station and the data transmitted through the relay terminal may be the same.

Similarly, the remote terminal may transmit data directly to the base station. Then, the base station may receive the data directly from the remote terminal. In addition, the remote terminal may transmit data to the base station through the relay terminal. Then, the base station may receive the data transmitted through the relay terminal. In this case, the data transmitted directly by the remote terminal and the data transmitted through the relay terminal may be the same.

On the other hand, when a signal level or signal quality with respect to the base station, which is periodically reported by the remote terminal, falls below a first threshold, the base station may release the connection with the remote terminal and may also release the DC. In this case, the remote terminal may maintain the connection with the relay terminal. In addition, when a signal level or signal quality with respect to the relay terminal, which is periodically reported by the remote terminal, falls below a first threshold, the base station may release the connection with the relay terminal and may also release the DC. In this case, the remote terminal and the base station may maintain the connection. On the other hand, even when data can be transmitted and received reliably through the relay terminal because the signal level or signal quality with respect to the relay terminal, which is periodically reported by the remote terminal, becomes greater than or equal to a second threshold, the base station may release the connection with the remote terminal and may also release the DC.

Figure 24:
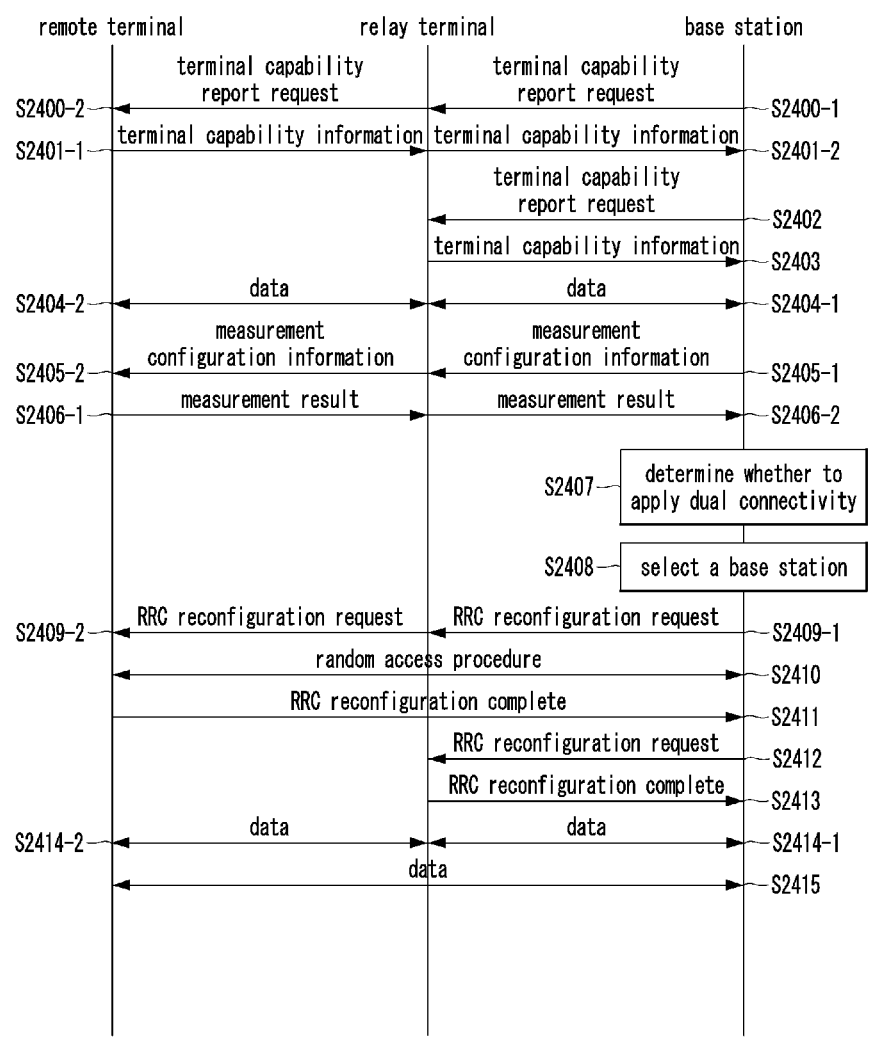
FIG. 24 is a sequence chart illustrating the third exemplary embodiment (i.e., FIG. 15) of the DC method in a communication system.

FIG. 24 is a sequence chart illustrating the third exemplary embodiment (i.e., FIG. 15) of the DC method in a communication system.

Referring to FIG. 24, in the DC method, a remote terminal may establish an RRC connection with a base station. When the RRC connection is established and the remote terminal is in an RRC connected mode, the base station may transmit a terminal capability report request signal to the remote terminal through a relay terminal (S2400-1, S2400-2). In this case, the base station may transmit the terminal capability report request signal to the remote terminal through the relay terminal by using a higher layer parameter used for the terminal capability report request. Accordingly, the remote terminal may receive the terminal capability report request signal from the base station through the relay terminal, and the remote terminal may generate terminal capability information according to a specific procedure.

In this case, the remote terminal may include an indicator indicating whether or not it supports the DAPS in the terminal capability information. The remote terminal may transmit the terminal capability information including the indicator indicating whether the remote terminal supports the DAPS to the base station through the relay terminal (S2401-1, S2401-2). Then, the base station may receive the terminal capability information from the remote terminal through the relay terminal. Accordingly, the base station may identify whether the remote terminal supports the DAPS.

Meanwhile, the relay terminal may establish an RRC connection with the base station. The base station may transmit a terminal capability report request signal to the relay terminal when the relay terminal is in an RRC connected mode. In this case, the base station may transmit the terminal capability report request signal to the relay terminal using a higher layer parameter for the terminal capability report request (S2402). Accordingly, the relay terminal may receive the terminal capability report request signal from the base station, and the relay terminal may generate terminal capability information according to a specific procedure.

In this case, the relay terminal may include an indicator indicating whether the relay terminal support the L2 relay structure or the L3 relay structure. As such, the relay terminal may transmit the terminal capability information including the indicator indicating whether the relay terminal supports the L2 relay structure or the L3 relay structure to the base station (S2403). Then, the base station may receive the relay terminal capability information including the indicator indicating whether the relay terminal supports the L2 relay structure or the L3 relay structure from the remoter terminal. Accordingly, the base station may identify whether the relay terminal supports the L2 relay structure or the L3 relay structure.

Meanwhile, the base station may connect to the relay terminal and transmit data to the remote terminal through the relay terminal (S2404-1, S2404-2). Then, the remote terminal may receive the data from the base station through the relay terminal. Conversely, the remote terminal may connect to the relay terminal and transmit data to the base station through the relay terminal. Then, the base station may receive the data from the remote terminal through the relay terminal.

Meanwhile, the base station may transmit measurement configuration information to the remote terminal through the relay terminal so as to perform measurement on relay terminals and base stations located in the vicinity (S2405-1, S2405-2). Then, the remote terminal may receive the measurement configuration information from the base station through the relay terminal. In addition, the remote terminal may measure neighboring relay terminals and base stations according to the received measurement configuration information, and report a measurement result to the base station through the relay terminal (S2406-1, S2406-2).

In this case, the remote terminal may include a relay terminal list including information on the measured neighboring relay terminals, and/or signal level information or signal quality information of each relay terminal in the relay terminal list in the measurement result. In addition, the measurement result may include an identifier of each relay terminal. In addition, the measurement result may include a base station list of measured neighboring base stations, signal level information or signal quality information of each base station in the base station list. In this case, the base station list may include a base station to which the remote terminal is currently connected through the relay terminal. In addition, the measurement result may include an identifier of each base station.

On the other hand, the base station may receive the measurement result from the remote terminal through the relay terminal. Accordingly, the base station may identify the base station list of the measured base stations in the vicinity of the remote terminal, and signal level information or signal quality information of each base station in the base station list. Accordingly, the base station may determine whether to connect to any one base station by considering at least one of the signal level or signal quality of each base station in the base station list.

In this case, the base station may identify whether at least one base station having a signal level or signal quality equal to or greater than a first threshold exists based on the signal level information or signal quality information of each of the base stations in the base station list. The base station may determine whether the relay terminal supports the L2 relay structure when the existence of at least one base station having a signal level or signal quality equal to or greater than the first threshold is identified. The base station may determine to apply DC when the relay terminal supports the L2 relay structure (S2407). In this case, the base station may proceed as described above after identify that the remote terminal supports the DAPS. In addition, the base station may perform such the process after identifying that at least one or more base stations are connected through Xn interface(s).

Meanwhile, the base station may select one base station from the at least one or more base stations when it is determined to apply DC (S2408). In this case, the base station may select a base station having the best signal level or signal quality based on signal level information or signal quality information of each of the base station. Here, the at least one base station may be a base station to which the remote terminal accesses through the relay terminal.

Thereafter, the base station may perform an RRC reconfiguration procedure for the remote terminal. To this end, the base station may establish an RRC connection by performing an RRC reconfiguration procedure for the remote terminal through the relay terminal. That is, the base station may transmit an RRC reconfiguration request message to the remote terminal through the relay terminal (S2409-1, S2409-2). Then, the remote terminal may receive the RRC reconfiguration request message from the base station through the relay terminal. Then, the remote terminal may access the base station by performing a random access procedure with the base station (S2410).

Thereafter, the remote terminal may transmit an RRC reconfiguration complete message to the base station to complete the RRC reconfiguration procedure (S2411). In addition, the base station may maintain the RRC connection with the relay terminal in order to apply dual connectivity. To this end, the base station may transmit an RRC reconfiguration message to the relay terminal (S2412). Then, the relay terminal may receive the RRC reconfiguration message from the base station. Accordingly, the relay terminal may perform an RRC reconfiguration to maintain the RRC connected state. In this case, the relay terminal may access the base station and communicate with the base station through the PC5 interface. Then, the relay terminal may transmit an RRC reconfiguration complete message to the base station to complete the RRC reconfiguration procedure (S2413). Thereafter, the base station may transmit data to the remote terminal through the relay terminal (S2414-1, S1414-2). Then, the remote terminal may receive the data transmitted through the relay terminal. In addition, the base station may directly transmit data to the remote terminal (S1415). The remote terminal may then receive the data from the base station. In this case, the data transmitted directly by the base station and the data transmitted through the relay terminal may be the same.

Similarly, the remote terminal may transmit data directly to the base station. Then, the base station may receive the data from the remote terminal. In addition, the remote terminal may transmit data to the base station through the relay terminal. Then, the base station may receive the data transmitted through the relay terminal. In this case, the data transmitted directly by the remote terminal and the data transmitted through the relay terminal may be the same.

On the other hand, when a signal level or signal quality with respect to the base station, which is periodically reported by the remote terminal, falls below a first threshold, the base station may release the connection with the remote terminal and may also release the DC. In this case, the remote terminal may maintain the connection with the relay terminal. In addition, when a signal level or signal quality with respect to the relay terminal, which is periodically reported by the remote terminal, falls below a first threshold, the base station may release the connection with the relay terminal and may also release the DC in the same manner. In this case, the remote terminal may maintain the connection with the base station. On the other hand, even when the signal level or signal quality with respect to the base station, which is periodically reported by the remote terminal, becomes greater than or equal to a second threshold, and thus data can be reliably transmitted and received through the base station, the base station may release the connection with the remote terminal, and may also release the DC. A procedure according to the relay-to-relay connection may be illustrated similarly to the above, and the above three items may be equally applied.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first base station in a communication system, the operation method comprising:
 identifying whether a first terminal supports a dual active protocol stack (DAPS);
 identifying whether a first relay terminal supports a layer 2 (L2) relay structure based on a first terminal capability information including information on whether the first relay terminal supports the L2 relay structure; and
 in response to identifying that the first terminal supports the DAPS and the first relay terminal supports the L2 relay structure, configuring dual connectivity for the first terminal using the first relay terminal,
 wherein the identifying whether the first relay terminal supports the L2 relay structure based on the first terminal capability information including information on whether the first relay terminal supports the L2 relay structure comprises:
  requesting, from the first terminal, information on a base station to which the first relay terminal is connected;
  receiving, from the first terminal, the information on the base station to which the first relay terminal is connected;
  in response to determining that the base station to which the first relay terminal is connected is the first base station based on the received information on the base station to which the first relay terminal is connected, requesting a first terminal capability report from the first relay terminal;
  receiving from the first relay terminal, the first terminal capability information including information on whether the first relay terminal supports the L2 relay structure; and
  identifying whether the first relay terminal supports the L2 relay structure based on the first terminal capability information.

2. The operation method according to claim 1, wherein the identifying whether the first terminal supports the DAPS comprises:
  requesting a second terminal capability report from the first terminal;
  receiving, from the first terminal, a second terminal capability information including information on whether the first terminal supports the DAPS; and
  identifying whether the first terminal supports the DAPS based on the second terminal capability information.

3. The operation method according to claim 1, wherein the identifying whether the first terminal supports the DAPS comprises:
  requesting a second terminal capability report from the first terminal connected to the first base station via a second relay terminal;
  receiving, from the first terminal and via the second relay terminal, a second terminal capability information including information on whether the first terminal supports the DAPS; and
  identifying whether the first terminal supports the DAPS based on the second terminal capability information.

4. The operation method according to claim 1, wherein the configuring dual connectivity for the first terminal using the first relay terminal comprises:
  transmitting, to the first terminal, measurement configuration information;
  receiving, from the first terminal, a measurement result including a received signal quality for the first base station;
  in response to determining that the received signal quality is greater than or equal to a first threshold, maintaining connection with the first terminal; and
  configuring dual connectivity for the first terminal using the first relay terminal.

5. The operation method according to claim 1, further comprising:
  transmitting first data to the first terminal; and
  transmitting second data to the first terminal via the first relay terminal.

6. The operation method according to claim 1, further comprising:
  receiving, from the first terminal, a measurement result including a received signal quality for the first base station; and
  in response to determining that the received signal quality is less than a first threshold, releasing configuration of the dual connectivity by releasing connection with the first terminal while maintaining connection between the first terminal and the first relay terminal.

7. The operation method according to claim 1, further comprising:
  receiving, from the first terminal, a measurement result including a received signal quality for the first relay terminal; and
  in response to determining that the received signal quality for the first relay terminal is less than a second threshold, releasing configuration of the dual connectivity by releasing connection between the first base station and the first terminal while maintaining connection between the first terminal and the first relay terminal.

8. An operation method of a first terminal in a communication system, the operation method comprising:
  receiving, from a base station, a terminal capability report request;
  transmitting, to the base station, terminal capability information including information on whether the first terminal supports a dual activation protocol stack (DAPS);
  measuring a first received signal strength for neighboring relay terminals;
  transmitting, to the base station, a list of the neighboring relay terminals and information of the measured first received signal strength;
  receiving, from the base station, information on a relay terminal selected from among the neighboring relay terminals and a dual connectivity request; and
  configuring dual connectivity by being connected with the selected relay terminal while maintaining connection with the base station.

9. The operation method according to claim 8, further comprising:
  transmitting first data to the base station; and
  transmitting second data to the base station via the selected relay terminal.

10. The operation method according to claim 8, further comprising:
  measuring a second received signal strength for the selected relay terminal;
  transmitting, to the base station, information on the second received signal strength measured for the selected relay terminal;
  in response to determining that the second received signal strength is less than a threshold, receiving, from the base station, a request of releasing the dual connectivity with the selected relay terminal; and
  releasing the connection with the selected relay terminal.

11. A first base station comprising a processor configured to cause the first base station to:
  identify whether a first terminal supports a dual active protocol stack (DAPS);
  identify whether a first relay terminal supports a layer 2 (L2) relay structure based on a first terminal capability information including information on whether the first relay terminal supports the L2 relay structure; and
  in response to identifying that the first terminal supports the DAPS and the first relay terminal supports the L2 relay structure, configure dual connectivity for the first terminal using the first relay terminal,
  wherein in the identifying whether the first relay terminal supports the L2 relay structure based on the first terminal capability information including information on whether the first relay terminal supports the L2 relay structure, the processor further causes the first base station to:
request, from the first terminal, information on a base station to which the first relay terminal is connected;
receive, from the first terminal, the information on the base station to which the first relay terminal is connected;
in response to determining that the base station to which the first relay terminal is connected is the first base station based on the received information on the base station to which the first relay terminal is connected, request a first terminal capability report from the first relay terminal;
receive, from the first relay terminal, the first terminal capability information including information on whether the first relay terminal supports the L2 relay structure; and
identify whether the first relay terminal supports the L2 relay structure based on the first terminal capability information.

12. The first base station according to claim 11, wherein in the identifying whether the first terminal supports the DAPS, the processor further causes the first base station to:
request a second terminal capability report from the first terminal;
receive, from the first terminal, a second terminal capability information including information on whether the first terminal supports the DAPS; and
identify whether the first terminal supports the DAPS based on the second terminal capability information.

13. The first base station according to claim 11, wherein in the identifying whether the first terminal supports the DAPS, the processor further causes the first base station to:
request a second terminal capability report from the first terminal connected to the first base station via a second relay terminal;
receive, from the first terminal and via the second relay terminal, a second terminal capability information including information on whether the first terminal supports the DAPS; and
identify whether the first terminal supports the DAPS based on the second terminal capability information.

14. The first base station according to claim 11, wherein in the configuring dual connectivity for the first terminal using the first relay terminal, the processor further causes the first base station to:
transmit, to the first terminal, measurement configuration information;
receive, from the first terminal, a measurement result including a received signal quality for the first base station;
in response to determining that the received signal quality is greater than or equal to a first threshold, maintain connection with the first terminal; and
configure dual connectivity for the first terminal using the first relay terminal.

* * * * *